(12) United States Patent
 Jessen

(10) Patent No.: US 12,198,210 B2
(45) Date of Patent: *Jan. 14, 2025

(54) DATA COLLECTION, STORAGE, AND PROCESSING SYSTEM USING ONE OR MORE INPUTS

(71) Applicant: Carl Reed Jessen, Spokane, WA (US)

(72) Inventor: Dane Christian Jessen, Tacoma, WA (US)

(73) Assignee: Carl Reed Jessen, Spokane, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,249

(22) Filed: Oct. 18, 2023

(65) Prior Publication Data

US 2024/0046387 A1 Feb. 8, 2024

Related U.S. Application Data

(60) Continuation of application No. 17/183,165, filed on Feb. 23, 2021, now Pat. No. 11,842,416, which is a continuation of application No. 16/049,453, filed on Jul. 30, 2018, now Pat. No. 10,970,800, which is a division of application No. 14/693,574, filed on Apr. 22, 2015, now abandoned.

(51) Int. Cl.
  *G06Q 50/16* (2024.01)
  *G06Q 30/02* (2023.01)
(52) U.S. Cl.
  CPC ......... *G06Q 50/16* (2013.01); *G06Q 30/0278* (2013.01)

(58) Field of Classification Search
  CPC ............................ G06Q 50/16; G06Q 30/0278
  See application file for complete search history.

(56) References Cited

U.S. PATENT DOCUMENTS

| 8,346,578 B1 | 1/2013 | Hopkins, III et al. |
| 2016/0033966 A1 | 2/2016 | Farris et al. |
| 2016/0063642 A1 | 3/2016 | Luciani et al. |
| 2016/0314545 A1 | 10/2016 | Jessen |

OTHER PUBLICATIONS

3DR, "2007—the Vision", retrieved on Apr. 17, 2015, at URL: http://3drobotics.com/about/, 7 pages.
ArduPilot, Home, "ArduPilot Autopilot Suite", retrieved on Apr. 17, 2015, at URL: http://ardupilot.com/, 3 pages.

(Continued)

*Primary Examiner* — Aryan E Weisenfeld
(74) *Attorney, Agent, or Firm* — NORTON ROSE FULBRIGHT US LLP

(57) ABSTRACT

A system for collecting, storing, and/or analyzing data received from one or more inputs comprising a property information database, a profile preference database, and one or more modules for accessing the databases. The system may receive data from a multiple listing service, internet source, and/or drone. The system may calculate and store a predicted property value and/or compare the predicted property value to a stored listed property price. A real estate offer and/or orders for an inspection, appraisal, contractor walk-through, preliminary title report, or loan applications may be generated and/or sent to an entity based, at least in part, on information stored in the property information database and/or the profile preference database.

20 Claims, 8 Drawing Sheets

(56) References Cited

OTHER PUBLICATIONS

"Databases and data access APIs", OpenStreetMap, Wiki, retrieved on Apr. 17, 2015, at URL: http://wiki.openstreetmap.org/wiki/Databases_and_data_access_APIs, 4 pages.
"Geocoding", Wikipedia, retrieved on Apr. 17, 2015, at URL: https://en.wikipedia.org/wiki/Geocoding, 6 pages.
"Geographic information system", Wikipedia, retrieved on Apr. 17, 2015, at URL: https://en.wikipedia.org/wiki/Geographic_information_system, 20 pages.
Google Developers, "Hello Maps", retrieved on Apr. 17, 2015, at URL: https://developers.google.com/maps/, 6 pages.
Google Search (Year: 2021).
Griffin, "Project Tango: Google to sell tech to 3D-scan the world this year," The Independent, Apr. 17, 2015, retrieved at URL: http://www.independent.co.uk/life-style/gadgets-and-tech/news/project-tango-google-technology-to-3dscan-the-whole-world-could-be-in-phones-this-year-10018821.html, 6 pages.
Kickstarter, "Zano—Autonomous. Intelligent, Swarming. Nano Drone. (Zano, Taking Your Selfies To New Heights)", retrieved on Apr. 17, 2015, at URL: https://www.kickstarter.com/projects/torquing/zano-autonomous-intelligent-swarming-nano-drone, 13 pages.
Matterport.com, "7 Millington Street, Toronto, Floor 1", retrieved on Apr. 17, 2015 at URL: https://my.matterport.com/show/?m=D5nxnnqfMVP, 1 page.
McLean, "Agricultural drone service launches in Hayden," Journal of Business, Feb. 12, 2015, retrieved at URL: http://www.spokanejournal.com/local-news/agricultural-drone-service-launches-in-hayden/, 4 pages.
Morais, "GIS Data Explored—Vector and Raster Data," GIS Lounge, retrieved on Apr. 17, 2015, at URL: http://www.gislounge.com/geodatabases-explored-vector-and-raster-data/, 5 pages.
Nyu, AR Drone, (Year: 2015).
Office Action for U.S. Appl. No. 14/693,574, mailed on Aug. 31, 2017, Jessen, "Data Collection, Storage, and Processing System Using One or More Inputs", 17 pages.
Ogc, "Geospatial and location standards for," retrieved on Apr. 17, 2015, at URL: http://www.opengeospatial.org/, 1 page.
"Open Geospatial Consortium," Wikipedia, last modified Mar. 12, 2015, retrieved on Apr. 17, 2015, at URL: https://en.wikipedia.org/wiki/Open_Geospatial_Consortium, 4 pages.
"Openpilot," retrieved on Apr. 17, 2015 at URL: http://www.openpilot.org, 2 pages.
OpenStreetMap, retrieved from Apr. 17, 2015, at URL: https://www.openstreetmap.org/#map=2/12.2/139.0, 1 page.
Paparazzi, "The Paparazzi Project: the Free Autopilot," last modified Apr. 13, 2015, retrieved on Apr. 17, 2015, at URL: http://wiki.paparazziuav.org/wiki/Main_Page, 7 pages.
Risen, "Amazon, Lawmakers Demand Better FAA Drone Rules," U.S. News and World Report, Feb. 17, 2015, retrieved at URL: http://www.usnews.com/news/articles/2015/02/17/amazon-lawmakers-demand-better-faa-drone-rules, 3 pages.
Roblin, Pylons Dronairports, https://www.trendhunter.com/trends/drone-dock (Year: 2015).
SmartAP, Smart AutoPilot, "Advanced UAV Flight Control System," retrieved on Apr. 17, 2015, at URL: http://sky-drones.com/, 3 pages.
"TU Delft—Ambulance Drone," YouTube, published Oct. 26, 2014, retrieved on Apr. 17, 2015, at URL: https://www.youtube.com/watch?v=y-rEl4bezWc, 3 pages.
Usgs, "Mission Headlines," Landsat Missions, published Apr. 16, 2015, retrieved on Apr. 17, 2015, at URL: http://landsat.usgs.gov/, 2 pages.
"Virtual reality drone control—Verge Update," YouTube, published Nov. 24, 2014, retrieved on Apr. 17, 2015, at URL: https://www.youtube.com/watch?v=eYbHpxVaWD4, 4 pages.
"Why Everything is Getting Louder," Bosker (Year: 2019).

DATA COLLECTION, STORAGE, AND PROCESSING SYSTEM USING ONE OR MORE INPUTS

CROSS-REFERENCE TO RELATED APPLICATIONS

This application is a continuation of and claims priority to U.S. patent application Ser. No. 17/183,165 titled "Data Collection, Storage, and Processing System Using One or More Inputs" and filed on Feb. 23, 2021, which is a continuation of and claims priority to U.S. patent application Ser. No. 16/049,453 titled "Data Collection, Storage, and Processing System Using One or More Inputs" and filed on Jul. 30, 2018, which is a divisional of and claims priority to U.S. patent application Ser. No. 14/693,574 titled "Data Collection, Storage, and Processing System Using One or More Inputs" and filed on Apr. 22, 2015. All of these applications are herein incorporated by reference in their entireties.

BACKGROUND

Real estate brokers spend substantial amounts of time and resources collecting and analyzing information about properties so they can price and market the properties accurately. Much of the property information a real estate broker collects as it prepares to sell a property is uploaded to a multiple listing service (MLS), so that it can be shared with other brokers representing potential buyers. For instance, property information may be uploaded to the California Regional Multiple Listing Service (CRMLS), the Metropolitan Regional Information System (MRIS), and/or other services using Internet Data Exchange (IDX) or the Real Estate Transaction Standard (RETS).

However, real estate is unlike other major asset classes because each piece of property is unique. Furthermore, potential buyers can be equally idiosyncratic, each having their own histories, needs, biases, and intentions for purchasing property. The unusual nature of real estate transactions often leads to notoriously "high-friction" costs, meaning the transaction itself has a multitude of costs and fees associated with it, e.g., brokerage fees and commissions, research costs, time, etc.

It can be difficult for brokers to anticipate what information will satisfy each potential buyer's needs, so real estate brokers would like as much information as possible about the properties they are attempting to sell. However, the time spent physically examining properties can be expensive. Therefore, brokers are often forced to limit the amount of information they collect and risk failing to satisfy a potential buyers' property information needs with the immediacy that potential buyers require.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference number multiple times may indicate a feature that may be singular or plural. The use of a different reference number in a different figure may indicate a similar or identical item.

DETAILED DESCRIPTION

Overview

Figure 1:
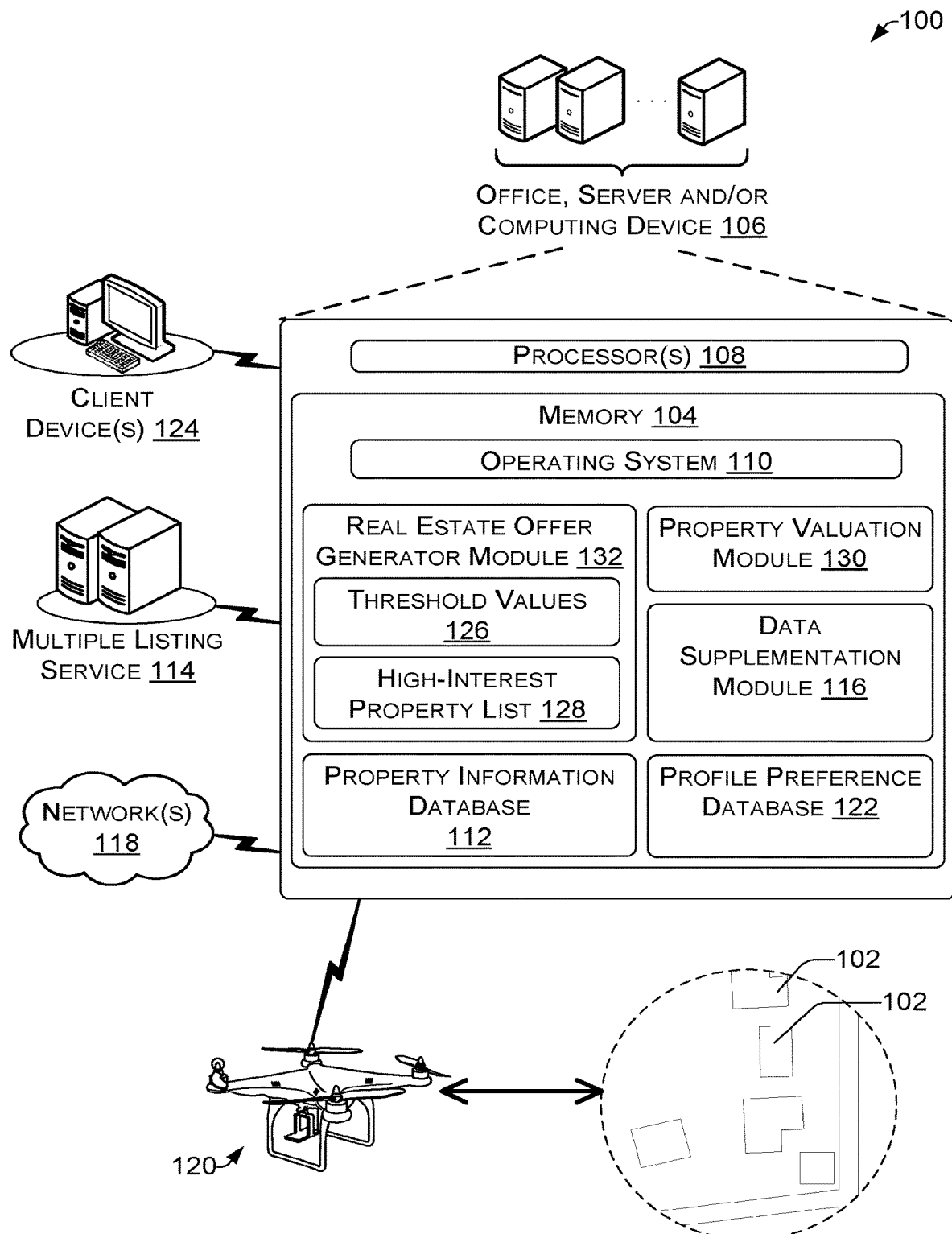
FIG. 1 illustrates an example system configured to collect, store, and/or analyze data from one or more inputs.

Real estate transactions are "high-friction" transactions due to a vast amount of information and circumstances that can affect real estate values, and potential buyers, or potential securitizers of the property. This disclosure is directed to a system which, in some examples, may collect, store, and/or process information related to physical properties (e.g., residential, commercial, public, governmental, undeveloped land, partially developed land, parking lots, and/or combinations thereof), such as properties for sale or potentially for sale, for reasons of valuation, to reduce the costs and time associated with real estate transactions, inspections, or appraisals.

In some examples, the system receives data from one or more inputs and stores the data in one or more memories. The system determines which inputs and/or how many inputs from which to receive further data based, at least in part, on data already received in real-time, and automatically updates or changes the inputs. In some embodiments, due to the collecting, processing and/or storing of the data, the system provides a manner for accessing the data that is real-time and/or unique, meaning that each occurrence of accessing the data provides an output to a user that is specific to the entity accessing the data, and specific to a time at which the data is accessed (i.e., is "up-to-date"). In some examples, the system generates populated documents (such as a Purchase and Sale Agreement PDF), and sends the document in an automated, real-time manner, with the most up-to-date information available. The system reduces redundancy by selectively changing inputs, seeking the most relevant/important data while omitting unnecessary data. For at least some of these reasons, some embodiments of the system provides increased user efficiency and/or increased user interaction performance.

In some examples, the system may comprise one or more modules (i.e., software functionalities stored in the memory) which, when executed may access and/or use information stored in one or more databases. For instance, the system may comprise a property information database that stores information related to one or more physical properties (e.g., a location, square footage, year built, etc.). The property information database may receive property information from one or more sources, such as a multiple listing service (MLS). A data supplementation module may provide information to the property information database, such as information collected from the internet via web analytics API and/or from a drone that visits the physical property. In some instances, the drone may be dispatched to collect missing information, to verify information about the physical property, gather previously uncollected data, map the property in three dimensions, and/or to provide a real-time virtual experience of the physical property.

In some instances, the data supplementation module (and/or other parts of the system) may provide information to the property information database. The information of the property information database may be used by a property valuation module to calculate a predicted value of the physical property (e.g., using linear regression analysis). The property valuation module may value the property as it currently stands (as-is), or as an estimation of value due to potential changes made to the property (to-be). The system may calculate a predicted value and may store the predicted value, as well as a listed price (for instance, that may be received from the MLS), and may compare the predicted value to the listed price. In some instances, the system may generate and/or send an offer to purchase the property based, at least in part, on the comparison of the predicted value to the listed price. By collecting information from multiple inputs/sources, the system may provide an improved predicted value, which may provide an improved offer, and the system may provide the offer with an immediacy often lacking from the real estate market.

The system may calculate rehabilitation costs and/or compare the rehabilitation costs to a potential value of the property. The system may calculate a cost to increase a value of the property from a bottom quartile to an upper quartile of value, with respect to other properties in a same geographic region. The system may identify a property with a high potential value but a low current value (which may be reflected in a listed price). In some examples, the system may include a profile preference database (which may store one or more profiles associated with one or more entities, such as a real estate brokerage or investment firm) to provide information about what property metrics should be collected, stored, and/or analyzed.

In some instances, the system may provide more abundant, relevant information in a timelier manner than some real estate brokers and/or property valuation services may be able to provide. The system may be used at least for buying property, selling property, calculating a mortgage, insurance appraisals, inspections, landscaping bids, refinancing, calculating remodeling costs, taking inventory of a securities portfolio, and/or calculating property valuations for tax purposes.

Multiple and varied example implementations and embodiments are described throughout. However, these examples are merely illustrative and other implementations and embodiments of the system may be implemented without departing from the scope of the disclosure. For instance, the implementations, or portions thereof, may be rearranged, combined, used together, duplicated, partially omitted, omitted entirely, and/or may be otherwise modified to arrive at variations on the disclosed implementations.

Illustrative Data Collection, Storage, and/or Analysis System

FIG. 1 illustrates an example environment or system 100 configured to collect, store, and/or analyze information from one or more inputs. In some instances, the information may comprise property information which relates to one or more physical properties (hereafter referred to as "the property 102") and/or a value of the property 102. In some examples, the system 100 may generate an output, such as an offer to purchase the property 102 based, at least in part, on the property information. The property information may comprise one or more pieces of data related to the property 102. In some instances, the property information may comprise one or more characteristics/features that may affect a value of the property 102. In some examples, the property information may be associated with a timestamp such that the system 100 may collect, store, update, and/or analysis the property information in a real-time matter.

In some examples of the techniques discusses herein, the methods of operation may be performed by one or more application specific integrated circuits (ASIC) or may be performed by a general purpose processor utilizing software defined in computer readable media. In the examples and techniques discussed herein, the memory device may comprise computer-readable media and may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

In some embodiments, the system 100 may include one or more software functionalities configured as one or more modules, which may be stored in one or more memories ("the memory 104") at a single location or in multiple distributed locations (e.g., "cloud computing/storage"). For instance, the modules may be stored in the memory 104 of a computing device 106, such as a central office, datacenter, server room, desktop computer, laptop computer, mobile device (e.g., smart phone, smart watch, and/or other wearable device), drone, automotive, and/or smart home with computing capabilities. One or more of the computing device/s may include a processor 108, the memory 104, and/or an operating system 110 stored on the memory 104. The modules may be stored in the memory 104 as processor-readable instructions, which when executed by the processor 108 configure the computing device 106 to perform functions that may include some or all of the functions described herein. In some instances, the system 100 may comprise a parallel processing system using multiple processors to process distributed portions of data which are re-aggregated.

The modules described herein are intended to represent example divisions of the software for purposes of discussion, and are not intended to represent any type of requirement or required method, manner, or necessary organization.

Accordingly, while various "modules" are discussed, their functionality and/or similar functionality could be arranged differently (e.g., combined into a fewer number of modules, broken into a larger number of modules, etc.). In some instances, one or more databases may be stored in the memory 104. The databases discussed herein may have alternative arrangements (e.g., combined into fewer number of databases, broken into a larger number of databases, etc.).

In some examples, the system 100 may comprise a property information database 112 that may store the property information. The property information database 112 may receive the property information from one or more multiple listings services ("the MLS 114"), such as the California Regional Multiple Listing Service (CRMLS), the Metropolitan Regional Information System (MMS), and/or other services. In some instances, the property information database 112 may receive information from any source using Internet Data Exchange (IDX), Real Estate Transaction Standard (RETS), File Transfer Protocol (FTP), or any other data standards or formats such as a XML or YAML data feed, the JavaScript Object Notation (JSON) message standard, the Binary JSON (BSON) message standard, a Simple Object Access Protocol (SOAP) protocol or Representational State Transfer (REST) protocol. In some examples, the property information database 112 may comprise an update schedule that determines a time or multiple times at regular or irregular intervals that the property information database 112 receives the property information from the MLS 114. For instance, the property information database 112 may receive property information from the MLS 114 about every second, five seconds, 10 seconds, 15 seconds, 30 seconds, minute, five minutes, 10 minutes, 20 minutes, 30 minutes, hour, two hours, four hours, bi-daily, daily, bi-weekly, and/or weekly. The property information database 112 may receive property information from the MLS 114 about every 0.1-0.5 seconds, 0.1-1 seconds, 1-2 seconds, 2-5 seconds, 5-10 seconds, 1-2 minutes, 2-5 minutes, 5-10 minutes, 10-20 minutes, 30-60 minutes, 0.1-1 hours, 0.5-1 hours, 1-2 hours, 2-4 hours, 4-8 hours, 12-24 hours, 1-2 days, etc. In some instances, the property information database 112 may receive property information from the MLS 114 responsive to an occurrence of an event, such as a property being put on the market. In some examples, the property information may comprise one or more values corresponding to one or more property metrics.

In some embodiments, the property information database 112 may request and/or receive property information from a data supplementation module 116. The data supplementation module 116 may request and/or receive property information from the MLS 114 and/or from a source that is different than the MLS 114, such as a network 118 (e.g., an internet or intranet) and/or a drone 120. The request may be generated and/or sent in response to an occurrence of an event, by identifying missing, and/or by "high-interest," "desired," or "attention-needed" property information.

In some examples, the system 100 may comprise a profile preference database 122. The profile preference database 122 may request, receive, and/or store profile information that correspond to one more profiles ("the profile") associated with one or more entities ("the entity"). The entity may comprise a real estate broker, a real estate brokerage firm, a potential real estate buyer/seller, an individual person, a building supplies company, a survey entity (e.g., census data collector), an insurance company, a hedge fund, a private equity fund, and/or any other businesses, people, or organizations involved or interested in the information of real estate markets. In some instances, the profile preference database 122 may receive the profile information from a client device 124, which may comprise any of the computing devices discussed above. For instance, the entity may use the client device 124 to submit profile information to the profile preference database 122 over the network 118. Additionally or alternatively, the profile preference database 122 may receive profile information from another source, such as information received by a phone call, through traditional mail ("snail mail"), a text message, an instant message, an email, and/or information received from another database that stores entity-specific information, such as a database of a social media site, a real estate information web service (e.g., Zillow®), and/or a data brokerage firm.

In some embodiments, the profile information stored in the profile preference database 122 may comprise one or more threshold values (hereafter referred to as "the threshold value 126"). The threshold value 126 may comprise data indicating a preference of the profile corresponding to the entity for the property metric value. For instance, the property metric may comprise measurable or otherwise determinable features of the property 102 (e.g., square feet, year built, proximity to a school, etc.), or its owners or inhabitants, which, in some instances, may affect a value of the property 102. The property metric value may comprise a measured or determined value (number, quantity, or characteristic) of the property metric for the property 102. The threshold value 126 may comprise a preference or limit for the property metric value of the entity of the profile.

In some examples, the profile preference database 122 may comprise a "high-interest" property list 128. For instance, the "high-interest" property list 128 may store associations of the profile to one or more properties identified as "high-interest" properties. Although the terminology "high-interest" is used in this application, the "high-interest" property list 128 may comprise a "desired" property list, a "predetermined" property list, an "indicated" property list, a "selected" property list, a "significant" property list, "attention-needed" property, and/or the like. In some examples, the "high-interest" property list 128 may comprise a subset of the one or more properties 102 that are determined to more relevant to the profile than other properties of the one or more properties 102. A classification of the property 102 as a "high-interest" property may be determined by comparing the threshold value 126 of the profile to one or more of the property metric values associated with the property 102. Additionally or alternatively, the property 102 may be classified as a "high-interest" property based, at least in part, on other information, such as an indication by the entity associated with the profile that the entity would like to monitor the property 102, or by information collected by a web analytics API that determines an association between the property 102 and the entity.

In some embodiments, the system 100 may comprise a property valuation module 130. The property valuation module 128 may receive and/or access property information stored in the property information database 112. Additionally or alternatively, the property valuation module 130 may receive and/or access property information from any of the sources discussed above that may provide property information to the property information database 112. In some examples, the property valuation module 130 may apply a regression analysis, such as a linear regression, logistic regression, probabilistic matching, artificial neural networks, support vector machines, statistical clustering, and/or other forms of classification and/or regression analysis to calculate one or more predicted property values from at least the one or more property metric values. In some instances, the predicted property value generated by the property valuation module 130 may be stored in the property information database 112.

In some examples, the system 100 may comprise a real estate offer generation module 132. The real estate offer generation module 132 may communicate with and/or access the profile preference database 122, the threshold value 126, the high-interest property list 128, and/or the predicted property value generated by the property valuation module 130. In some instances, the real estate offer generation module 132 may comprise a threshold comparison module which may compare the property metric value of the property 102 to the corresponding threshold value 126 to determine if the property metric value meets, exceeds, and/or falls short of the threshold value 126.

In some embodiments, the real estate offer generation module 132 may comprise a Purchase and Sale Agreement application program interface (API) which may populate one or more fields of a Purchase and Sale Agreement document. In some examples, information to populate the one or more fields may be accessed and/or derived from the threshold comparison module, the property valuation module 130, the property information database 112, and/or the profile preference database 122. In some instances, the real estate offer generation module 132 may make a determination to send a real estate offer to the entity associated with the profile. In some examples, a populated or partially populated Purchase and Sale Agreement may be sent from the real estate offer generation module 132 to the entity associated with the profile, for instance, in response to a property metric value meeting a threshold value 126, in response to a property metric value exceeding a threshold value 126 by a predetermined amount, and/or in response to a predetermined number or set of threshold values 126 being met and/or exceeded. In some instances, the Purchase and Sale Agreement may be partially populated by the real estate offer generation module 132 and/or partially populated by another module and/or entity. In some examples, (e.g., such as when data of one or more fields is unavailable) the field may be populated with a fillable data field enabling a user to supplement the missing data upon receiving the Purchase and Sale Agreement. The Purchase and Sale Agreement may be customizable to meet a specification indicated by the entity. For example, the Purchase and Sale Agreement may include the entity's company logo, slogan, or other branding parameters.

Figure 2:
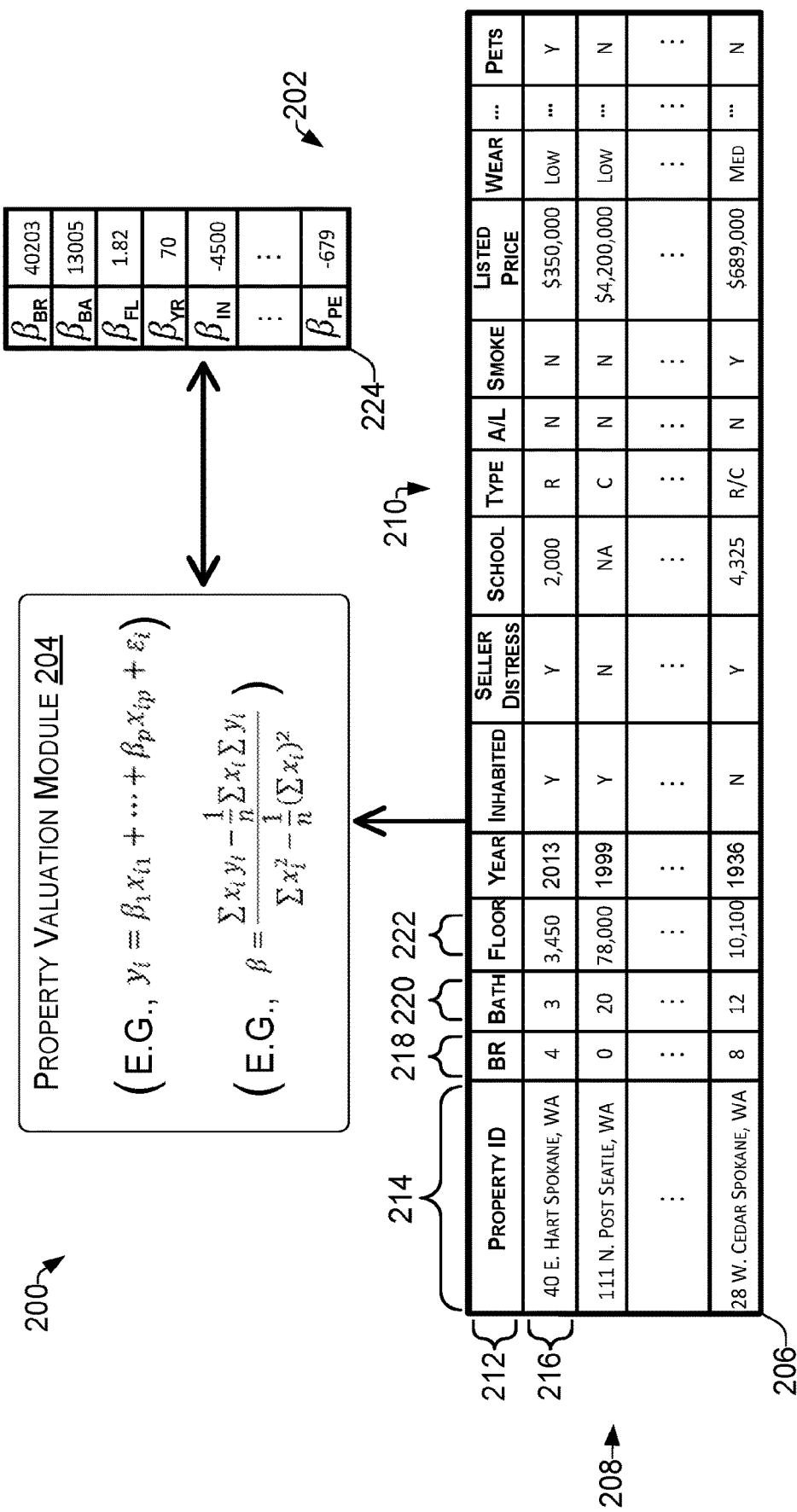
FIG. 2 illustrates an example system, which may form a portion of the system of FIG. 1, including a property information database and a property valuation module.

FIG. 2 illustrates an example environment or system 200 configured to collect, store, and/or analyze information from one or more inputs. In some instances, the system 200 may comprise a portion of the system described above. The system 200 may comprise a property information database 202 that receives and stores information related to one or more properties. The system may comprise a property valuation module 204 for calculating a predictive property value.

In some embodiments, the property information database 202 may comprise one or more spreadsheets 206 and/or other data structures that store information specific to each of one or more properties. The spreadsheet 206 may comprise a plurality of rows 208 and a plurality of columns 210. A first row may comprise a header row 212 to describe a type of information stored in each column 210, such as describing one of the columns 210 as a property identity column 214. Each field of the property identity column 214 may include information to identify a physical property, the rest of the information of that respective row pertaining to the identified physical property. For instance, a second row 216 may include an address, such as "40 E Hart Rd Spokane, WA" in the property identity column. Therefore, the remaining fields (i.e., columns) of the second row 216 are associated with the physical property identified as "40 E. Hart Rd Spokane, WA".

In some instances, the property identity column 214 may comprise a property address, a property GPS location, a property name (e.g., "The Paulson Building"), an assigned property ID code (e.g., "2321-WA") or any other name, symbol, or piece of data to indicate a physical property with which the respective row of property information is associated. Additionally or alternatively, location information (e.g., GPS coordinates, address, etc.) may comprise a different one of the columns 210 than the property identity column 216.

In some embodiments, a second column 218 of the spreadsheet 206 may comprise a property metric, such as "number of bedrooms". Each field in the second column 218 may comprise a property metric value indicating a number of bedrooms of a property associated with a one of the rows 208 (e.g., a property identified in the property identity column 214). By way of example, the second row 216 may include a number "3" in the second column 218, indicating that the property of the second row 216 (e.g., the "40 E. Hart Rd Spokane, WA" property) comprises 3 bedrooms.

In some examples, the spreadsheet 206 may comprise a third column 220, a fourth column 222, or any number N columns, each column corresponding to a property metric. In some examples, each column of the N columns may correspond to a measurable or identifiable feature or characteristic of a physical property, such as a condition of a building, a distance from another building or municipal feature (e.g., a school, hospital, fire department, police department, golf course, gym, airport, main arterial, highway, freeway, park, pool, vendor or specific type of business (e.g., delivery firm), building codes (and/or compliance, or lack thereof, with building codes), building permits, remodeling permits, and/or information retrieved from an archive or other database, such as facebook posts, news articles, public records (e.g., city, county, and/or state records), google maps lookup tables (e.g., that provide GPS coordinates for addresses), etc. In some examples, one, multiple, and/or each of the columns 210 comprising a property metric may correspond to another column including a time-stamp. For instance, the corresponding time-stamp column may indicate a time the property metric was received, measured, verified, etc. Although the spreadsheet 206 is discussed, additionally or alternatively, the property information could be stored as a comma delimited list, a NoSQL data structure, or any other data type, data structure, and/or data system.

In some embodiments, the property metrics corresponding to each column may be collected from one or more sources, such as a multiple listing service, a drone, and/or a network application (e.g., internet application). In some embodiments, the property metric may comprise a number of bathrooms, a number of bedrooms, a size of one or more bedrooms, a size of one or more bathrooms, a ceiling height, a floor plan area (e.g., square feet, square meters), year of being built, a type of floor plan (e.g., "open" floor plan, "closed" floor plan, etc.) year of renovations/remodeling, type of use (e.g., rental, owner's residence, retail, storage, mixed use, etc.), whether or not the property is currently inhabited, last date of inhabitance, seller distress (e.g., any indication of a seller's need to sell quickly), proximity to one or more building or municipal feature, geographic region, traffic conditions of roads adjacent and/or near the property, presence of lead, asbestos, caustic chemicals, mold, and/or other detectable substances that may negatively impact an inhabitant's health, wear condition, historical listed prices, historical transaction information, photos, videos, information derived from photos and/or videos, data about past, current and/or future resident, owner, and/or renter (e.g., credit score, marital status, recent family death, etc.) and/or a current listed price. In some embodiments, the property metric may comprise a feature or characteristic with any real numerical value (e.g., 65, 10,000, 0.34, −10), any integer value (1, 5, 65), a binary value (e.g., Yes/No, 1/0), a quality rating which, in some examples, may be converted to a numerical value system (e.g., low=1, medium low=2, . . . high=5, etc.), and/or a predetermined number of options (e.g., residential, commercial, mixed residential/commercial and/or combinations thereof) which, in some instances, may correspond to a numerical value according to a conversion key.

In some instances, the property metric may comprise a derivation from one or more other property metrics. For instance, a property metric of "renovation costs," "repair costs," and/or "value maximization costs," may be derived from one or more other property metrics, such as "square feet" and/or "level of wear". In some instances, other calculations/determinations may be derived from the property information database 202. For example, a potential rehab cost may be calculated/derived from one or more other calculated/derived values. For instance, a predicted total incurred cost (e.g., a listed price plus a rehab/renovation) may be subtracted from a predicted potential value to calculate a predicted profit. For instance, an "inventory of materials for renovations" may be generated from one or more of the property metrics. For instance, a "predicted offer value" may be derived from a predicted value, as well as other market forces, such as volume, level of inventory, bullishness, etc.

In some embodiments, the system 200 may comprise the property valuation module 204, which may use a linear regression analysis to calculate a predictive value of the property. The linear regression calculation may comprise a sum of one or more input variable values ("the input variable"), represented in FIG. 2 as Each input variable value may multiply to a parameter vector coefficient, represented in FIG. 2 as 0. In some examples, the input variable value may correspond to one of the property metrics. Each of one or more parameter vector coefficients may correspond to data, such as historical data of property valuations, used to calculate an amount each unit of the input variable affects the total predicted value. In some instances, the parameter vector coefficient may be calculated using a maximum likelihood estimator (MLE) and/or an ordinary least squares (OLS) model (e.g., to detect fraudulent activity and/or to identify relevant, but undocumented property information). The parameter vector coefficient may be calculated using data from other modules and/or databases of the system. In some examples, the parameter vector coefficient may be associated with a timestamp that indicates a time the parameter vector coefficient and/or the property metric value is received, measured, collected, and/or calculated. Additionally or alternatively, the property valuation module 204 may use another statistical model or combinations of statistical models, such as non-parametric models, semi-parametric models, Gaussian distributions, chi-squared distributions, nested models, and/or other regression or classification models.

In some embodiments, the parameter vector coefficient may be stored in the memory, as a spreadsheet 224, and/or as a list, as discussed above with regard to the property metrics. The parameter vector coefficient may be updated and/or changed based, at least in part, on an updated, changed, and/or added property metric value of the property metric to which the parameter vector coefficient corresponds. For instance, a first parameter vector coefficient may be calculated based, at least in part on a first property metric value or multiple property metric values (e.g., a subset or all of the property metric values stored in the memory), one, multiple, and/or all of which may be associated with a first timestamp. The first parameter vector coefficient may be associated with a first time indicated by first timestamp. A second parameter vector coefficient that may correspond to a same property metric as the first parameter vector coefficient may be calculated based, at least in part, on a second property metric value or a second subset of property metric values, which may be associated with a second timestamp. In some examples, the second timestamp may indicate a second time that is later than the first time of the first timestamp. In some examples, the second parameter vector coefficient may replace the first parameter coefficient in the property valuation module calculations of predicted property values, based at least in part on a sequence of the first and second timestamps. In other words, after receiving a new property metric value (i.e., with a timestamp later than any timestamp of the previous property metric values), the property valuation module 204 may update a corresponding parameter vector coefficient (e.g., automatically, in real-time, and/or without human interaction). Additionally or alternatively, the property valuation module 204 and/or the real estate offer generation module may be updatable (e.g., automatically, in real-time, and/or without human interaction) in a similar manner using one or more timestamps.

In some examples, the property valuation module 204 may calculate a predicted property value when a new property is added to the property information database 202 (e.g., as determined by a timestamp indicating a time that is later than the timestamp of the properties previously stored in the property information database 202), each time a property is added to the property information database 202, when a predetermined property metric value is received, measured, and/or calculated, and/or when a predetermined set of property metric values are received, measured and/or calculated. In some examples, a predicted property value may be calculated for the property on a schedule of regular or irregular intervals and one or more calculated predicted values may be stored in the property information database 202, for instance, in a "predicted value" column. In some examples, property valuation module may calculate predicted values for a future time, such as for investment purposes. For instance, the property valuation module may calculate a predicted value for about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and/or 40 years into the future, and/or a range of years into the future comprising any two of the aforementioned values.

In some examples, the property valuation module 204 may calculate a predicted property value using one or more property metric values associated with the physical properties and/or one or more "potential" (e.g., hypothetical) property metric values as well as financial metrics such as an interest rate, an exchange rate, and/or a bond yield curve. For instance, the property valuation module 204 may calculate a "potential" predicted property value indicating a hypothetical value of the property if certain criteria were met, the certain criteria comprising one or more of the "potential" property metric values used to calculate the "potential" predicted property value. By way of example, the property valuation module 204 may calculate that the property may have a "potential" predicted property value if, for instance, the property metric of "bathrooms" were changed from a property metric value of "2" to a "potential" property metric value of "3".

In some embodiments, the property valuation module 204 may access other databases to calculate the predicted property value. For instance, the property valuation module 204 may access a database storing information related to market interest rates such as the prime rate or the London Interbank Offered Rate (LIBOR), currency exchange rates such as the exchange rate between Chinese Renminbi to US Dollars, the bond rate yield curve, or any other financial rate. In some instances, the property valuation module 204 may access financial information that is specific to a time at which the financial information is accessed (e.g., is "up-to-date").

In some embodiments, the property valuation module 204 may calculate a predicted property value of the physical property by calculating a cost to replace and/or build the physical property. For instance, using one or more property metric values (e.g., location, bedrooms, bathrooms, floor plan square footage, garage square footage, etc.) of the physical property, the property valuation module 204 may gather quotes for costs of material and labor to replace the physical property (e.g., by accessing and/or "scraping" one or more databases through a network, through an MLS, etc.). In some instances, the property valuation module 204 may generate a cost to build the physical property (e.g., using one or more APIs of a construction company and/or hardware store). In some instances, the property valuation module 204 may identify one or more comparable properties (e.g., properties that share one or more similar property metric values, such as square footage, number of bathrooms and bedrooms, geographic location, etc., with the physical property) which have been recently built (e.g., within the last 1, 2, 3, 4, or 5 years), and may adjust a listed price of the comparable property/ies for other factors (e.g., property metric values) that are different than the physical property, such as land value, wear, age, etc. In some instances, this method may be called the "Cost Approach."

In some examples, the property valuation module 204 may make a comparison between prior selling prices or listed prices to a current or past selling or listed price of the physical property or a comparable property, which may indicate a condition of the physical property. For instance, a condition of the physical property may be determined to be "like-new" if the physical property sells at a price that is close to (e.g., within 1%, 2%, 3%, 4%, 5%, 6%, 7%, 8%, 9%, 10%, 11%, 12%, 13%, 14%, 15% and/or a range comprising any two of the aforementioned percentages) a selling price and/or listing price of one or more newly built comparable property/ies. In some instance, this method may be called the "Estimated Condition Approach."

In some embodiments, the property valuation module 204 may calculate a predicted value of the physical property by comparing recent sales. For instance, the property valuation module 204 may identify one or more comparable properties and may quantify a difference between the physical property and the comparable property/ies in a dollar amount. For instance, a comparable property that has some similar property metrics (e.g., floor plan, year built, etc.) as the physical property may include a listed or sold price. If the comparable property has some different property metric values, such as an additional bedroom than the physical property (e.g., 4 bedrooms instead of 3 bedrooms), and bedrooms are determined to affect the value by $5,000 in that particular geographic area, then the physical property may be valued at the sold price of the comparable property minus $5,000. The comparable property/ies may be identified using a cluster algorithm, such as Nearest Neighbor Search (NNS). In some instances, the predicted value of the physical property may be displayed alongside the comparable property and its corresponding sold price. In some examples, this method may be called the "Sales Comparison Approach."

In some examples, the property valuation module 204 may calculate a predicted value of the physical property by calculating a potential cash flow from rents. For instance, the property valuation module 204 may identify local rental rates (e.g., using one or more MLS databases, website databases, etc.) and determine a comparable rental rate of the physical property (e.g., based, at least in part, on a number of tenants/potential tenants of the physical property). The rents may be incorporated into one or more capitalization rate (cap rate) formulas to determine the predicted value which may be used to derive what an investor would be willing to pay. In some instances, a demographic makeup of the geographic area of the physical property and/or other factors that may affect a risk profile of likely renters and/or a likely renter turnover rate may be used to calculate the predicted value. In some instances, this method may be called the "Income Capitalization Approach."

In some embodiments, the property valuation module may use one, some, or all of the aforementioned methods (The Cost Approach, The Estimated Condition Approach, The Sales Comparison Approach, and/or the Income Capitalization Approach") to calculate the predicted value of the physical property. In some instances, one or more of the aforementioned methods may be performed automatically when a property is added to the property information database 202. In some examples, one or more of the aforementioned methods may be weighted and/or aggregated to calculate the predicted value (e.g., based, at least in part, on a preference of a profile). In some examples, one or more of the aforementioned methods may be chosen to calculate the predicted value based on a scenario. For instance, the Cost Approach may be used to identify a forming property bubble, and/or to identify cheap underdeveloped land. The Income Approach may be used to inform a decision to rent or flip a property, and/or to determine potential economic profits.

Figure 3:
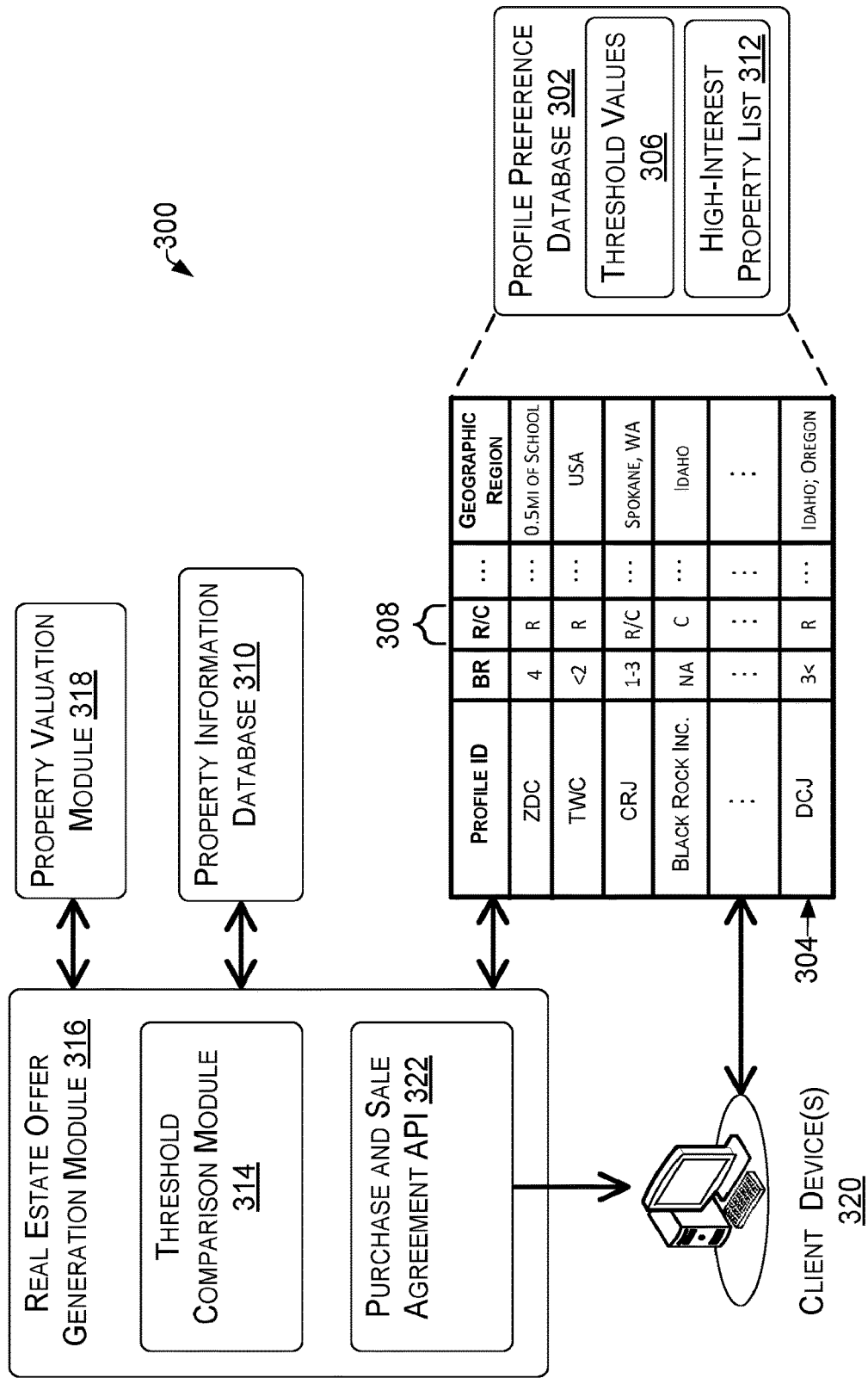
FIG. 3 illustrates an example system, which may form a portion of the system of FIG. 1, including a profile preference database and a real estate offer generation module.

FIG. 3 illustrates an example environment or system 300 configured to collect, store, and/or analyze information from one or more inputs. In some instances, the system 300 may comprise a portion of the system/s described above. The system 300 may comprise a profile preference database 302 which may receive and/or store information related to one or more entities ("the entity"). As noted above, the entity may comprise an individual, a business, and/or any other group or organization that may be interested in purchasing and/or selling real estate property.

In some examples, the profile preference database 302 may store one or more profiles ("the profile 304") associated with the entity. The profile 304 (which may comprise a row of a spreadsheet) may include information about the entity, such as a name of the entity, a location of the entity, and/or a type of the entity (e.g., type of business, status as an individual, etc.). In some embodiments, the profile 304 may include one or more preferences or thresholds 306, which may relate to the physical property, associated with the entity. For instance, the profile 304 may include a preference for a specific value, a range of values, and/or a threshold value of one or more property metrics. By way of example, the profile 304 may include a preference 308 for "Residential" or "Commercial" property. The profile 304 may comprise a preference for a floor plan of "greater than 4,500 square feet" or "between 3,500 and 4,500 square feet". The profile 304 may include a preference and/or threshold for any of the property metrics stored in a property information database 310, and/or other property metrics. The profile 304 may include a preference for a type of use (e.g., rental, owner's residence, retail, storage, mixed use, etc.). The profile 304 may include preference with a first threshold that is dependent on a second threshold. By way of example, the profile 304 may include a preference that "garage square feet>floor plan square feet".

In some examples, the profile preference database 302 may comprise the preference and/or threshold value (e.g., associated with one or more of the profiles 304) for a value calculated from the property metric values. For instance, the profile 304 may comprise a threshold and/or preference for a difference between a "listed property value" property metric value and a "predicted property value" property metric value. In some instances, the profile 304 may comprise a threshold and/or preference for a property metric value that indicates a potential to increase a value of the property, such as a "high wear" property metric value. In some instances, the property metric value may comprise information about one or more structural components (e.g., construction materials) constituting the physical property (e.g., a condition, a dimension, a quantity, a brand, a type, etc.).

In some embodiments, a plurality of profiles 304 may be stored in the profile preference database 302. Each of the plurality of profiles 304 may comprise the value and/or preference that is unique to the entity associated with each profile 304. In some embodiments, more than one profile may be associated with the entity. For instance, a private equity firm may comprise a different profile for each of multiple investment funds (e.g., three different investment funds). The threshold value and/or preference may be added to the profile preference database 304 at a time of creating the profile 304, and/or at a time after creating the profile 304 (e.g., the profile 304 may be updatable). In some instances, the entity may access information stored in one or more databases of the system by accessing the profile associated with the entity (e.g., through a graphical user interface). For instance, the profile may include automatically generated descriptions of one or more property/ies, hyperlinks to websites that mention the propery/ies, and/or hyperlinks to files or documents relevant to the property/ies.

In some examples, the profile preference database 302 may comprise a high-interest property list 312. The high-interest property list 312 may include a list of property identifications associated with one or more physical properties that have been determined to be of "high-interest" to the entity associated with the profile 304 of the high-interest property list 312. In some embodiments, a property may be determined to be a "high-interest" property and may be added to the high-interest property list 312 by the entity (e.g., if the entity is aware of a property that the entity would like to monitor and/or receive information about). In some examples, a property may be determined to be the "high-interest" property by a threshold comparison module 314. For instance, the threshold comparison module may receive the property metric value of the property from the property information database 310. The threshold comparison module 314 may receive the threshold value and/or preference from the profile preference database 302, and may compare the threshold value and/or preference to the property metric value/s to determine if the property metric value meets and/or exceeds the threshold value and/or preference.

By way of example and not limitation, an example profile 304 may comprise a threshold value of "greater than 3,500" to correspond with a property metric of "square feet". An example physical property may have a property metric value of "2,000" for the "square feet" property metric. In this example, the threshold comparison module 314 may determine that the property metric value for the "square feet" property metric of the example physical property does not meet the threshold value for the example profile 304. In some instances, the determination of whether or not the property metric value meets and/or exceeds the threshold value may be stored in the memory (e.g., in the profile preference database 302). In some examples, the property may be added to the "high-interest" property list, at least in part, because the property metric value meets and/or exceeds the threshold value. Additionally or alternatively, the threshold comparison module 314 may compare the property metric value to the threshold value for a property already included in the "high-interest" property value list 312. In some examples, the threshold comparison module 314 may access a profile stored in the profile preference database 302 and compare every threshold value associated with the profile 304 to a corresponding property metric value of one or more of the properties.

The threshold comparison module 314 may store the comparison in the profile preference database 302 and/or in the property information database 310. In some examples, the profile 304 may provide a preference indicating a threshold value and/or a property metric that the entity associated with the profile values more (e.g., deems more important for a buying decision) than other threshold values and/or other property metrics. In some examples, the entity may rank one or more threshold values to indicate an importance of the one or more threshold values to the entity.

In some examples, the system 300 may comprise a real estate offer generation module 316 (for instance, the threshold comparison module 314 may comprise a portion of the real estate offer generation module 316). The real estate offer generation module 316 may receive information from the property information database 310, the profile preference database 302, the threshold comparison module 314, a property valuation module 318, and/or from other sources. The real estate offer generation module 316 may determine to generate a real estate offer, generate the real estate offer, and/or send the real estate offer to an entity associated with the profile 304 (e.g., to a device 320 of the entity). In some instances, the real estate offer generation module 316 may generate a construction supplies list and/or may send the construction supplies list to an entity (e.g., a home improvement retail store). In some examples, the real estate offer generation module may send an instruction to contractor, sub-contractor or other personnel (e.g., an instruction to an inspector to visit/asses the property, an instruction to a painter to paint a portion of the property, etc.)

In some embodiments, the real estate offer generation module 316 may determine to send the real estate offer based on information from the property information database 310, the profile preference database 302, the threshold comparison module 314, and/or the property valuation module 318. In some instances, the real estate offer generation module 316 may weigh one or more input factors to make the determination to send based, at least in part on a logistic regression analysis. For instance, the profile 304 may include a preference that the entity receive the real estate offer for a property that meets and/or exceeds a threshold value and/or multiple threshold values (e.g., as determined by the threshold comparison module 314, and/or a property listed in the high-interest property list 312). The profile 304 may include a multi-property preference, such as a preference to receive a real estate offer for any property that meets a particular combination of threshold values and/or preferences. Additionally or alternatively, the profile 304 may include a property-specific preference, such as a preference to generate an offer for a particular property if a combination or one of multiple combinations of threshold values is met or exceeded. In some instances one or more properties may be grouped (e.g., based on a proximity to each other and/or based on a sharing of similar characteristics) and treated as a single property (e.g., which may be similar to a "bundle" of stock options). In some examples, the high-interest property list 312 may store a list of properties for which the real estate offer generation module 316 may generate an offer. In some instances, the real estate offer generation module 316 may generate an offer or an alert to sell a property if a property metric value falls below the threshold 306, according to a preference of the profile 304.

In some embodiments, the real estate offer generation module 316 may generate the real estate offer. The real estate generation module 316 may comprise an application programing interface ("the API 322") to populate one or more real estate offer forms, such as a Purchase and Sale Agreement and/or corresponding Addendum. For instance, after determining to generate the real estate offer, the API 322 may access information stored in the property information database 310 and/or the profile preference database 302. The API 322 may identify a field of the real estate offer form that corresponds with a field of the property information database 310 and/or the profile preference database 302, and the API 322 may copy data in the field of the property information database 310 and/or the profile preference database 302 into the corresponding field of real estate offer form. By way of example, the API 322 may access and copy an "entity name" from the profile preference database 302, a "property identification" from the property information database 310, a "predicted offer value" from the property information database 310 (which may correspond with an "offer price" field of the real estate offer form), and/or any other information from the property information database 310 and/or the profile preference database 302 that may correspond to a field of the real estate offer form. Additionally or alternatively, the API 322 may generate a description of the property and/or an explanation of an offer price based, at least in part, on information from the property information database 310 and/or the profile preference database 302. Based, at least in part, on the determining to generate the offer, the API 322 may generate a same real estate offer for multiple entities. Additionally or alternatively, the API 322 may generate a partially completed real estate offer (e.g., a real estate offer with a majority of the fields populated, such as about 70%, 80%, 90%, 95%, or 99% of the fields populated, and/or the fields that are not entity-specific) and may populate one or more remaining fields with information unique to the entity to which the partially completed real estate offer is to be sent at a time after generating the partially completed real estate offer. In some instance, the API 322 may recognize offer form parameters that are specific to the entity (e.g., Veteran's Administration may have a specific purchase and sale agreement that is required instead of a generic form.)

In some examples, the real estate offer generation module 316 may send the real estate offer to the entity associated with the profile 304. For instance, the real estate offer generation module 316 may generate an email, formatted API message, SMS, and/or other digital message including the information of the real estate offer and/or with the real estate offer attached as a separate file (e.g., word file, PDF file, etc.). The real estate offer generation module 316 may provide instructions to deliver a physical copy of the real estate offer, such as through traditional mail (i.e., "snail mail"). The real estate offer generation module 316 may send the real estate offer to the computing device 320 of the entity. In some examples, the real estate offer may be sent to the entity automatically (e.g., autonomously, without human interaction, etc.) and/or the real estate offer may be sent to an intermediary reviewer. In some examples, the offer may comprise an offer/request to visit the property in addition to or alternatively to an offer to purchase the property. In some instances, the entity may indicate a desire to visit one or more properties based on information provided by the real estate offer generation module 316. The entity may access/retrieve an offer that is stored in one or more databases of the system 300 in addition to or in lieu of the real estate offer generation module 316 sending the offer.

In some examples, the real estate offer generation module 316 may determine to generate a real estate offer, generate a real estate offer, and/or send a real estate offer automatically, in real-time, and/or without human interaction. The real estate offer generation module 316 may periodically assess the property information database 310 and/or the profile preference database 302 to determine if information has been added (e.g., "new" information) since a last time the real estate offer generation module 316 assessed the property information database 310 and/or profile preference database 302. For instance, the real estate offer generation module 316 may asses the property information database 310 and/or the profile preference database 302 every microsecond, millisecond, second, 10 seconds, minute, 10 minutes, hour, 4 hours, and/or day. If the real estate offer generation module 316 determines that new information has been added to the property information database 310 and/or the profile preference database 302 since the last assessment, the real estate offer generation module 316 may determine to generate a real estate offer. In some examples, the real estate offer generation module 316 may determine whether or not to generate a real estate offer each time information is added to the property information database 310 and/or the profile preference database 302. The determination to generate the real estate offer may be based, at least in part, on a preference of the profile 304 and/or the high-interest property list 312 and/or may use a logistic regression analysis.

In some embodiments, other modules may generate populated or at least partially populated documents, forms, and/or messages. For instance, a title report module may generate a preliminary title report for a title company (e.g., may generate an email, may populate a document using an API, etc.) and/or send a request to a third party to generate a title report. A scheduling module may generate a schedule for a visit and/or a request for a visit via an email, text message, and/or calendar invite (e.g., a walkthrough with a contractor and/or a potential buyer, etc.). An inspection module may generate a request for an inspection from an inspection company. An appraisal module may generate a request for an appraisal which may be sent to an appraisal company. A loan underwriting module may generate a request to begin a loan underwriting process to a hard money lender and/or a mortgage company and/or the loan underwriting module may generate a populated mortgage document. A finance module may generate budgets (e.g., rehab budgets, total selling costs budget, likely tax liability budget, etc.), loan interest report, amortization table, and/or other financial documents associated with a physical property. Any of the aforementioned modules may access one or more of the databases and/or other modules of the system 300 in a similar or different manner as the real-estate offer generation module 316, and may use any of the aforementioned communication methods for sending a generated document, form, and/or message.

In some instances, data stored in the profile preference database 302 and/or the property information database 310 may be stored securely with data encryption. In some instances, at least some of the data may be stored for a predetermined time period and then may be deleted after the predetermined time period has elapsed. In some examples, some or all of the data may be transferred (e.g., sold) to a third party. The profile preference database 302 may comprise an option so that the entity associated with the profile may indicate a preference for what is done with the data prior to and/or after the data is used by one or more modules of the system 300. The profile preference database 302 may comprise one or more options (e.g., check-boxes) to turn on/off and/or activate any of the modules of the system 300 and/or any of the functionalities of the modules of the system 300. In some embodiments, the data may be surfaced to the public through a web portal or mobile app. Access to the date may be provided in conjunction with advertising. In some instances, access to the data may be restricted to paying subscribers. In some instances, limited portions of the data may be provided freely while other portions may be provided to paying customers. Access to the data may be limited by geographic region, type of client used to access the data, government license or certification held by the user, and/or any other characteristic of the user or the user's condition.

Figure 4:
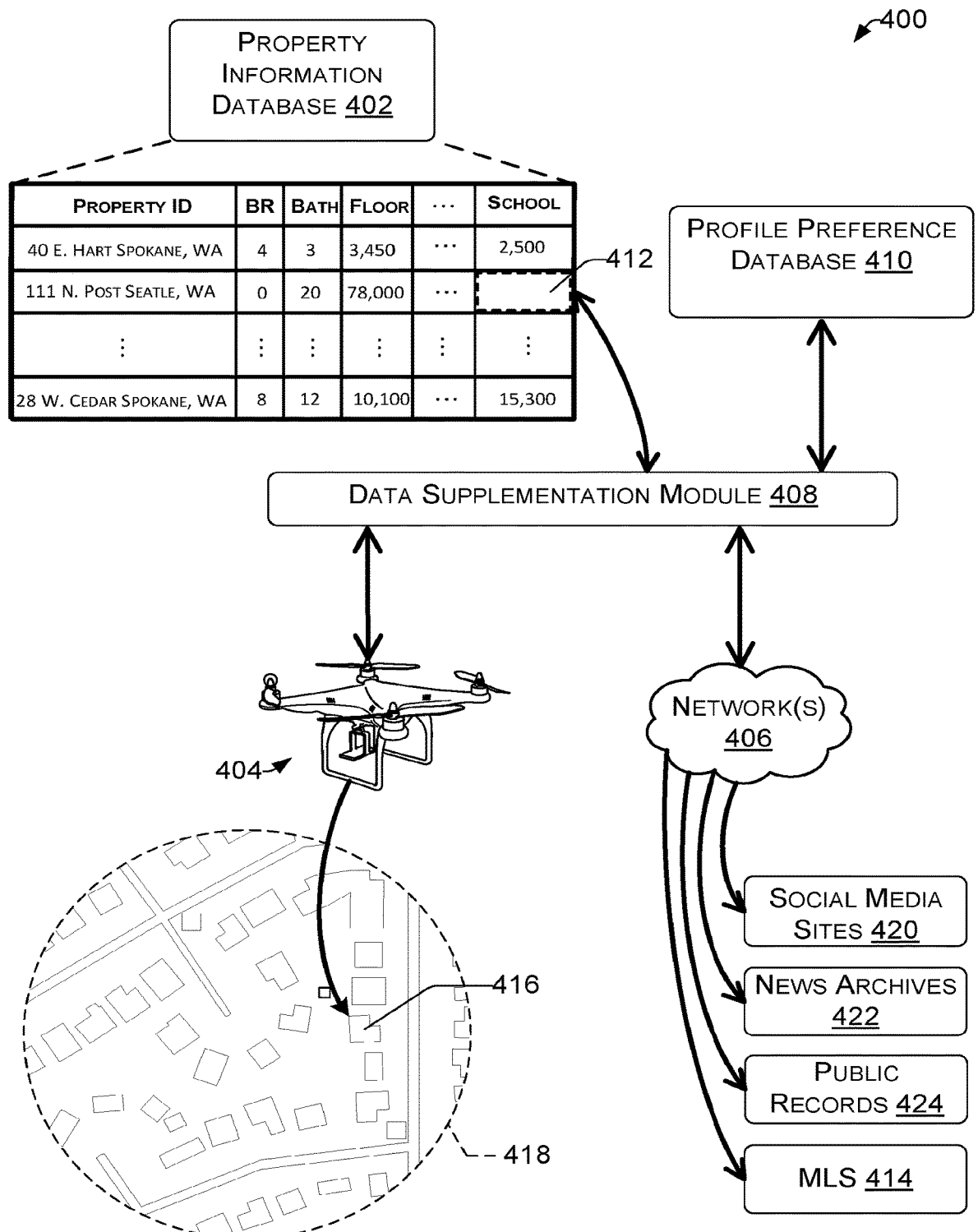
FIG. 4 illustrates an example system, which may form a portion of the system of FIG. 1, including a data supplementation module and one or more inputs.

FIG. 4 illustrates an example environment or system 400 configured to collect, store, and/or analyze information from one or more inputs. In some instances, the system 400 may comprise a portion of the system/s described above. The system 400 may comprise a property information database 402 which may receive data from one or more sources, such as a multiple listing service (MLS), a drone 404, and/or a network 406. In some instances, a data supplementation module 408 may provide information to the property information database 402 from one or more sources.

In some examples, the system 400 may comprise the data supplementation module 408 which may communicate with and/or access the property information database 402 and/or a profile preference database 410. The data supplementation module 408 may access information provided from a first source (e.g., the MLS) to identify missing information 412 (e.g., a property metric field missing a property metric value) and/or unverified information. The data supplementation module 408 may send a request for and/or retrieve the missing data 412 and/or unverified information from a second source (e.g., the drone 404, the network 406, an Amazon Mechanical Turk, an automated telephone polling service, an internet survey, and/or another MLS 410), or from the first source.

For instance, the property information database 402 may receive a first collection of information (one or more property metric values) from a first source, such as the MLS. The first collection of information may comprise one or more property identifications associated with one or more physical properties 416, and/or one or more property metric values associated with each of the property identifications. The data supplementation module 408 may identify a property metric field that is missing data 412, and/or the data supplementation module may determine that the missing data 412 is "relevant" (e.g., worth using resources to retrieve). For instance, the data supplementation module 408 may determine that the missing data 412 is "relevant" because the missing data 412 corresponds to a property metric (e.g., is in a property metric column) that is predetermined to be a high-relevance property metric. In other words, one or more property metric columns may be designated as a "high-relevance" column (e.g., by the entity, by the profile preference database 410, by the value prediction module, etc.), such that the data supplementation module 408 recognizes any missing data in the "high-relevance" column as "relevant" information, and proceeds to retrieve the missing data.

In some embodiments, the data supplementation module 408 may identify missing information 412 that is "relevant" and/or may retrieve the missing information 412 based, at least in part, on a preference stored in the profile preference database 410. For instance, a profile may indicate one or more property metrics that are "relevant" to the entity associated with the profile. The data supplementation module 408 may cross-reference property metrics determined to be "relevant" to an entity in the profile preference database with property metric values missing in the property information database 402 to identify missing property metric values that are "relevant". Additionally or alternatively, the data supplementation module 408 may identify a property metric value that is not missing (e.g., provided in the first collection of information), but determined to be "relevant". Such information may be determined to be "relevant" and unverified (e.g., from a single source, from a questionable source, etc.) and the entity may provide an indication that the entity would like the "relevant" information to be verified. In some instances, the "relevant" data may be determined to be unverified because the data was received more than a certain amount of time ago, such as a month ago, two months ago, three months ago, six months ago, etc. The certain amount of time may comprise a preference of the profile preference database 410.

In some examples, the data supplementation module 408 may identify missing information 412 that is "relevant" and/or may retrieve the missing information 412 based, at least in part, on the property valuation module. For instance, the property valuation module may determine that a property metric may be useful for generating a predicted property value (e.g., that including the property metric value in the predicted value calculation may reduce an error, reduce an error range, and/or increase an accuracy of the prediction). The data supplementation module 408 may cross-reference the property metric determined to be useful by the property valuation module with the property metric value in the property information database 402 to identify "relevant" property information, such as "relevant" property information that is missing and/or unverified.

In some examples, the data supplementation module 408 may send a request to receive information that supplements and/or verifies the identified "relevant" missing and/or unverified information. In some embodiments, the data supplementation module 408 may send a request to the drone 404 to provide the missing and/or unverified information. For instance, the request may include location information of the physical property 416 of the missing information (e.g., from the property information database 402) and/or a property metric to be measured, recorded, identified at the physical property 416 and/or at a neighborhood 418 of the physical property 416. In some examples, the data supplementation module 408 may receive a confirmation (e.g., a message and/or signal) that the request for information has been received by the drone 404.

In some embodiments, the data supplementation module 408 may send a request to receive data to supplement and/or verify the identified "relevant" missing and/or unverified information through the network 406, such as an internet or intranet. For instance, the data supplementation module 408 may comprise a web analytic module to access a website and/or a database. The database may comprise a database of a web service company, such as a social media site 420 (e.g., Facebook, LinkedIn, Twitter, Instagram, and the like), another real estate database (e.g., Zillow®, Trulia®) a news organization archive 422 (e.g., Reuters, BBC, the New York Times, and/or a regional news outlet), historical records and/or public records 424 (e.g., from a city hall) which collects information about individuals, businesses, organizations, and/or other entities that may be related to buying or selling physical property. In some examples, the web analytic module may comprise an API, such as a RESTless API and/or a RESTfull API, which may send a request for the missing and/or verifying information to one or more servers hosting the database. In some embodiments, the web analytic module may gather (e.g. "scrape") data from a website, which may be accessed by the data supplementation module 408.

In some instances, the data supplementation module 408 may assign one or more data sources a credibility score. The credibility score may be assigned manually by a user or based on historical verification events. By way of example, if a square footage metric received from the Spokane County Tax Assessors Office is determined to have been repeatedly found to be incorrect during past verification events, the Spokane County Tax Assessors Office may receive a low credibility score. By way of example, if a real estate agent posts information to a web site (e.g., facebook) describing a target property, and the posted information is verified by one, some, and/or all historical events related to the target property, future information created by the real estate agent may be given a high credibility score. In some examples, the data supplementation module 408 may compare the credibility score associated with a data source against a credibly threshold score in order to determine whether a verification of "relevant" information is required.

In some examples, the data supplementation module 408 and/or the property information database 402 may receive the missing and/or verifying information requested by the data supplementation module 408. For instance, the source (e.g., the drone 404, the database accessed through the network 406, etc.) may send the requested information to the property information database 402 and/or to the data supplementation module 408 (which may send the requested information to the property information database 402). In some examples, the data supplementation module 408 may fill the previously identified missing information 412 field of the property information database 402 with the received missing information. In some examples, the property information database 402 may comprise a column or list indicating a verification status associated with a property metric (i.e., indicating whether or not a property metric has been verified from one or multiple sources). The data supplementation module 408 may change a verification status (e.g., from "No" or "0" to "Yes" or "1") based, at least in part on, the received verification information.

Figure 5:
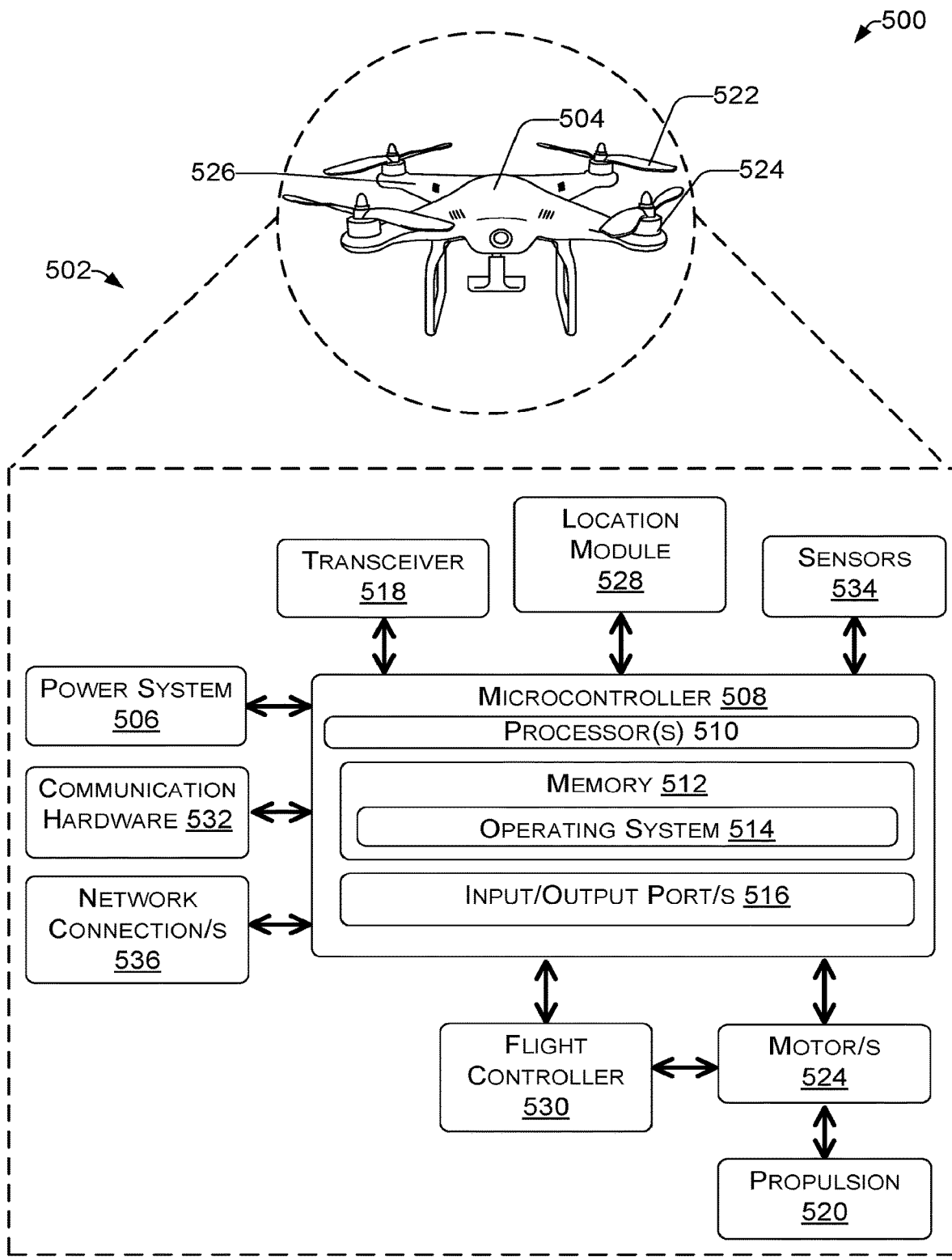
FIG. 5 illustrates an example system, which may form a portion of the system of FIG. 1, including a drone.

FIG. 5 illustrates an example environment or system 500 configured to collect, store, and/or analyze information from one or more inputs. In some instances, the system 500 may comprise a portion of the system/s described above. The system 500 may comprise a drone 502 (i.e., an unmanned aerial vehicle) which may communicatively couple to one or more modules of the system, such as a data supplementation module. The drone 502 may comprise a frame for mounting components and/or a housing 504 for enclosing at least some of the components. The frame and/or housing 504 may comprise a substantially rigid material, such as metal alloys, plastic (e.g., PVC, PE, Nylon, etc.), wood, carbon fiber, Kevlar, combinations thereof, and/or composites thereof. In some embodiments, the drone 502 may comprise a bladder of fluid having a density that is lower than air, such as helium and/or hydrogen.

In some examples, the drone 502 may comprise a power system 506 to provide power to some and/or all of one or more components (i.e., electrical components) of the drone. The power system 506 may comprise one or more batteries ("the battery"), such as a lithium ion battery. The battery may be rechargeable, for instance, when the drone 502 couples to a charging dock (e.g., wired charging and/or wireless inductive charging). In some examples, the drone 502 may comprise a recharger for the battery, such as a control system for switching the battery on/off to a charging bus bar coupled to an alternative power source, such as a solar panel. The power system 506 may provide power to one, some, any, and/or all of the components of the drone 502 that use power for operation.

In some examples, the drone 502 may comprise a microcontroller 508 which may communicatively couple to one or more components of the drone 502, e.g., through switches, resistors, and/or other electronic components. For instance, the microcontroller 508 may comprise a small computer comprising a processor 510, a memory 512 (storing one or more executable modules and/or an operating system 514), and/or one or more programmable input/output ports 516, which may, in some examples, comprise a single integrated circuit. In some examples, the microcontroller 508 may communicatively couple to a transmitter, receiver, transponder, and/or transceiver such as an RF transceiver 518. The transceiver 518 may send and/or receive data to and/or from components/modules of the system 500. For instance, the drone 502 may receive and/or send data to another transceiver/receiver of the data information collection, storage, and/or processing system (e.g., the data supplementation module, the property valuation module, etc.).

In some examples, the drone 502 may comprise one or more propulsion devices 520, such as one or more propellers ("the propeller 522") coupled to one or more motors ("the motor 524"), such as a brushless motor and/or a multi-rotor motor. Additionally or alternatively, the drone 502 may comprise jet propulsion, magnetic propulsion, or other types of propulsion devices. In some examples, the drone 502 may comprise a single propeller 522 or multiple propellers 522 (e.g., two, three, four, five, six, seven, eight, nine, ten, or more than ten propellers), each propeller 522 may connect to one of the motor/s 524 that converts power from the power system 506 into an angular force that rotates the propeller 522. In some embodiments, the propeller 522 may be mounted to an arm 526 extending horizontally from a body of the drone 502 and/or may be oriented with a vertical spin axis (such that the propeller 522 may provide a vertical lift of the drone 502). In some embodiments the motor 524 may couple to a speed controller which may comprise a portion of the microcontroller 508 and/or communicatively couple to the microcontroller 508. The drone 502 may comprise a 3-axis gyroscope, accelerometer, magnetometer, and/or ultrasound sensors to provide information for controlling the motor 524.

In some embodiments, the drone 502 may comprise a location module 528 for determining a location of the drone 502, navigating the drone 502 to and/or from a location (such as a location of a physical property) and/or for geocoding the location (e.g., the drone 502 may comprise spatial awareness software such as Google® Tango®). For instance, the location module 528 may comprise a geographic information system (GIS) (e.g., for collecting vector and/or raster data) to capture, store, manipulate, analyze, and/or manage spatial and/or geographical information. In some examples, the location module 528 may operate according to one or more established standards, such as an open geospatial consortium (OGC) standard (e.g., CSW, GML, etc.). In some embodiments, the location module 528 may access data of other location information services, such as Google Maps, Landsat, GPS, etc. In some embodiments, the drone 502 may comprise a mechanical and/or digital compass, which may communicatively couple to the location module 528. The location module 528 may form a portion of the microcontroller 508 and/or may communicatively couple to the microcontroller 508.

In some embodiments, the drone 502 may comprise a flight controller 530, which may comprise a portion of the microcontroller 508 and/or may communicatively couple to the microcontroller 508. For instance, the flight controller 530 may communicate with and/or control the motor 524 to stabilize the drone 502. In some instances the flight controller 530 may control one or more motors 524, may change the power provided to the motor 524 over a duration of time, may control the drone 502 with autopilot, and/or may direct the drone 502 from a first location to a second location. In some instances a direction of the flight controller 530 to the motor 524 may correspond to instructions received by the drone 502 including location information associated with a physical property. In some examples, the drone 502 may receive a set of location instructions (e.g., detailing one or multiple legs of a route) and/or the drone 502 may receive a starting location and an ending location and/or the drone 502 may calculate/determine a flight path.

In some examples, the drone 502 may receive a flight path (e.g., through a continuous stream of instructions and/or through a stored download of instructions) and/or the drone 502 may be controlled remotely. The drone 502 may receive/calculate an optimized flight path based on one or more factors such as fuel usage, temperature, wind, humidity, and/or FAA regulations for elevations, prohibited areas, and/or prohibited flight times of day. The drone 502 may be controlled by a remote control and/or wirelessly through a 2.4 Ghz, 5 Ghz, and/or other frequency connection. In some examples, the remote control may be handheld, installed in a vehicle, and/or installed at a drone dispatch building. The drone 502 may comprise a route which switches between autopilot and manual control (via the remote control), such as dispatching and travelling a distance to the physical location on autopilot, then switching to manual control once the drone 502 reaches the physical location. In some examples, the remote control may control multiple drones 502 assigned to collect property information corresponding to multiple property identifications stored in the property information database. In some examples, the drone 502 may comprise one or more autopilot platforms to provide interact/instruct the components of the drone 502, e.g., the motor 524. For instance, the drone 502 may comprise OpenPilot, Paparazzi, 3DR, APM, and/or SmartAP software. In some instances, the flight controller 530 may be configured to follow a ping (such as a ping from hardware at the physical property, from a mobile device, etc.).

In some examples, multiple drones 502 may idle (e.g., charging, stored, docked, having standby status) at a single location or multiple locations. The idling drones may receive information corresponding to multiple property identities stored in the property information database and may be dispatched from the single or multiple locations. In some embodiments, multiple drones 502 may survey and/or collect information at a single location and/or may collect data to construct a 3-D image, and/or any other information that may be re-constructed for presenting a virtual simulation of the property.

In some examples the drone 502 may comprise communication components (i.e., hardware 532 that may correspond with software), such as speaker/s, display/s (e.g., LCD display/s), camera/s, and/or microphone/s. For instance, the drone 502 may comprise components for communicating with people, external devices such as an automatic garage door opener, and/or other drones in an immediate environment of the drone 502. The drone 502 may provide and/or receive instructions to/from people and/or other drones. In some examples, the drone 502 may comprise human interaction artificial intelligence software to instruct one or more hardware components to interact with the immediate environment and/or people in the immediate environment.

In some embodiments the drone 502 may comprise one or more sensors 534 and/or components for collecting information of the immediate environment, such as the physical property and/or the neighborhood of the physical property. For instance, the drone 502 may comprise one or more cameras for capturing photos and/or video, an infrared sensor, x-ray sensor, radiation detector, chemical analysis sensor, voltmeter/current meter, spectroscopy, wireless transmission viability sensor, x-ray diffraction/x-ray fluorescence instrument, a sample acquisition instrument and/or 3-D scanning cameras and/or software, such as Google's Project Tango or Matterport. The one or more sensors 534 may detect asbestos, lead, moisture, material compositions, controlled substances (e.g., drugs, meth, heroine, crack), cigarettes, mold, wet paint, cleaning chemicals, dangerous chemicals, gas (such as a gas leak), metallic erosion, oxidization, resistance in wiring of the physical property, and/or an infestation (e.g., rodents, insects, birds, cats, and/or people, such as squatters).

By way of example, the drone 502 may capture audio, photographs, and/or video of the physical property and/or features of the physical property, which are compared to a pre-stored audio, photograph, and/or video profile. For instance, the drone may record an audio of "scurrying sounds" and compare it to a pre-stored audio profile to identify the "scurrying sounds" as mice. In some examples, the drone may collect one or more audio samples of the physical property, which may be used to determine an exterior and/or interior audio profile of the physical property (e.g., to indicate noise pollution such as from a nearby highway). The exterior and/or interior audio profile may be compared to one or more predetermined audio profiles to identify sound generating features and/or the exterior and/or interior audio profile may be accessed and/or listened by an entity, such as a potential buyer. By way of example, the drone 502 may capture a photograph of the physical property and compare it to a pre-stored photograph to determine the presence of, for instance, corrosion, oxidization, mold, etc. By way of example, the drone 502 may collect a sample (e.g., with a robotic arm, an adhesive, a collection box, an air intake, etc.) to assess a chemical composition of the sample.

In some examples, the drone 502 may comprise a network connection 536, such as an external memory connection, a USB port, an Ethernet port, an optical fiber port, and/or the like. For instance, the drone 502 may be configured to upload property information that has been collected and/or stored through the network connection 536. The drone 502 may travel to an uploading location (e.g., a vehicle, a dispatch center building, a data collection center building, etc.) after collecting the property information. The drone 502 may connect to a computing device through the network connection 536 to upload the property information system into the system 500 (e.g., to the property information database). Additionally or alternatively, the drone 502 may upload property information wirelessly, e.g., using the transmitter, transceiver 518 and/or transponder, through a data connection (e.g., 4G, 5G, LTE network, etc.), through Wi-Fi, and/or the like. The drone 502 may upload individual data packets corresponding to each piece of information collected by the drone 502 in a real-time manner, e.g., at a time substantially immediately following the time at which the piece of information is collected (e.g., a millisecond, a second, a minute and/or an hour after the information is collect) and/or the drone 502 may compile multiple pieces of information into a single data package and/or report for uploading after some time (e.g., a minute, an hour, a day, multiple days) has elapsed from the time of collecting the information and/or according to an upload schedule.

Figure 6:
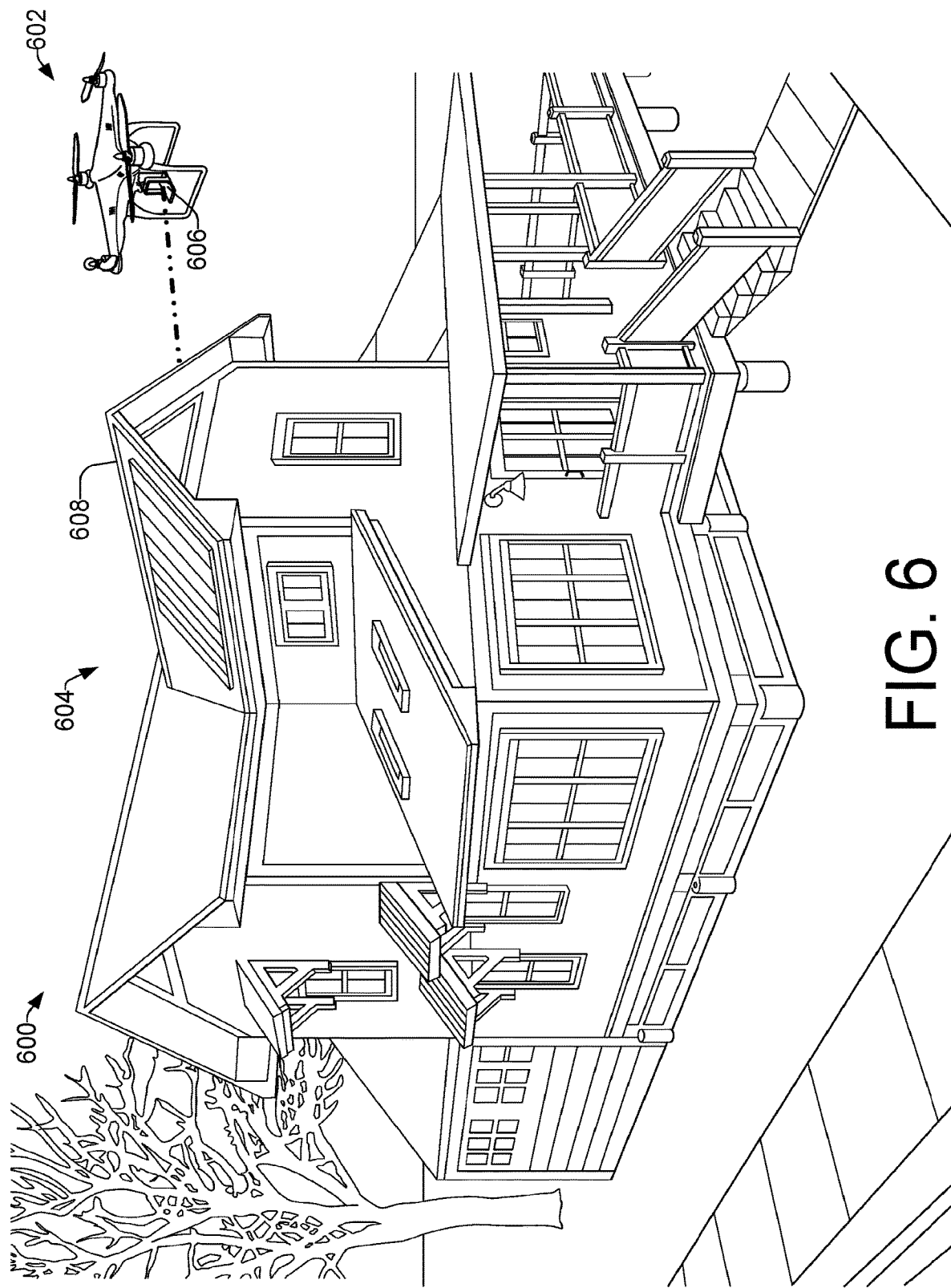
FIG. 6 illustrates an example system, which may form a portion of the system of FIG. 1, including a drone and a physical property.

FIG. 6 illustrates an example environment or system 600 configured to collect, store, and/or analyze information from one or more inputs. In some instances, the system 600 may comprise a portion of the system/s described above. FIG. 6 also illustrates an example drone 602 of the system 600 which may collect, store, and/or upload information of a physical property 604, such as information which may affect a value of the physical property 604.

As noted above, the drone 602 may receive location information of the physical property 604 and/or a property metric of the physical property to be measured, identified, collected, and/or calculated by the drone. Additionally or alternatively, the drone 602 may receive instructions to determine one or more property metric/s to measure, identify, collect, and/or calculate once the drone 602 has arrived at the physical property 604. The drone 602 may conduct an initial survey of the physical property 604 to determine which property metric of a predetermined list of property metrics is applicable to the physical 604 property and/or worth using resources to acquire. In some instances, the drone 602 may be dispatched in response to receiving an instruction from a module of the system 600 such that the drone 602 may be dispatched automatically, autonomously, and/or without human interaction.

In some examples, the drone 602 may use the location information of the physical property to travel (e.g., fly) to the physical property 604. The drone may direct one or more sensors 606 at the physical property (e.g., a feature of the physical property 608) to acquire a property metric value corresponding to the property metric to be measured, as noted above with regard to FIG. 5. The drone 602 may collect information indicating a status of one or more features of the house (e.g., a window, roof, foundation, yard, patio, sprinkler system, etc.). In some examples, the drone 602 may comprise a camera to provide a real-time virtual reality experience of the physical property (e.g., similar to Google Street View). The drone 602 may comprise 3-D mapping software, such as Matterport and/or Google® Tango®. The drone 602 may collect and send video, which may be in real-time, to a display (e.g., computer screen, mobile device screen, wearable devices such as a Google® Glass® headset, immersion devices such as an Oculus Rift® headset, etc.) of an exterior and/or interior of the physical property 604. In some instances, the drone 602 may be controllable by a viewer of the real-time display to provide interactions with the drone and a virtual 3-D environment. In some examples, information collected by the drone 602 may be sent to an implantable computing device which may, in some examples, send the information to the display.

In some examples, the drone 602 may asses the property 604 to collect a predictive view with the camera. For instance, the drone 602 may capture a first image from a first location, which may include an obstruction (e.g., trees). The drone 602 may move to a second location to capture a second image, which may illustrate a view omitting the obstruction (e.g., above or around the obstruction), and which may be more desirable to a potential buyer, e.g., may include a vista, natural feature (e.g., Mt. Rainier), cityscape, landscape, etc., than the view from image of the first location including the obstruction. In some examples, the drone 602 may collect information documenting potential improvements (e.g., cutting down trees and/or removing obstructions) which may increase a value of the physical property 604.

In some examples, the drone 602 may be designated to assess the property prior to receiving the instruction and/or location information. Additionally or alternatively, the drone 602 may comprise one of multiple drones of a standby drone swarm. For instance, the instruction may be sent to multiple drones having a standby status and may include a request for any available drone (e.g., within a proximity to the system 600 and/or the property 604) to indicate its availability so that the instruction may be assigned to the responding standby drone. In some instances, a human may be sent to the physical property 604 in addition to or alternatively to the drone 602. The human may collect, measure, store, and/or send any of the data discussed above with respect to the drone, such as with a tablet computing device and one or more sensors (e.g., a voltmeter, a camera, etc.).

Figure 7:
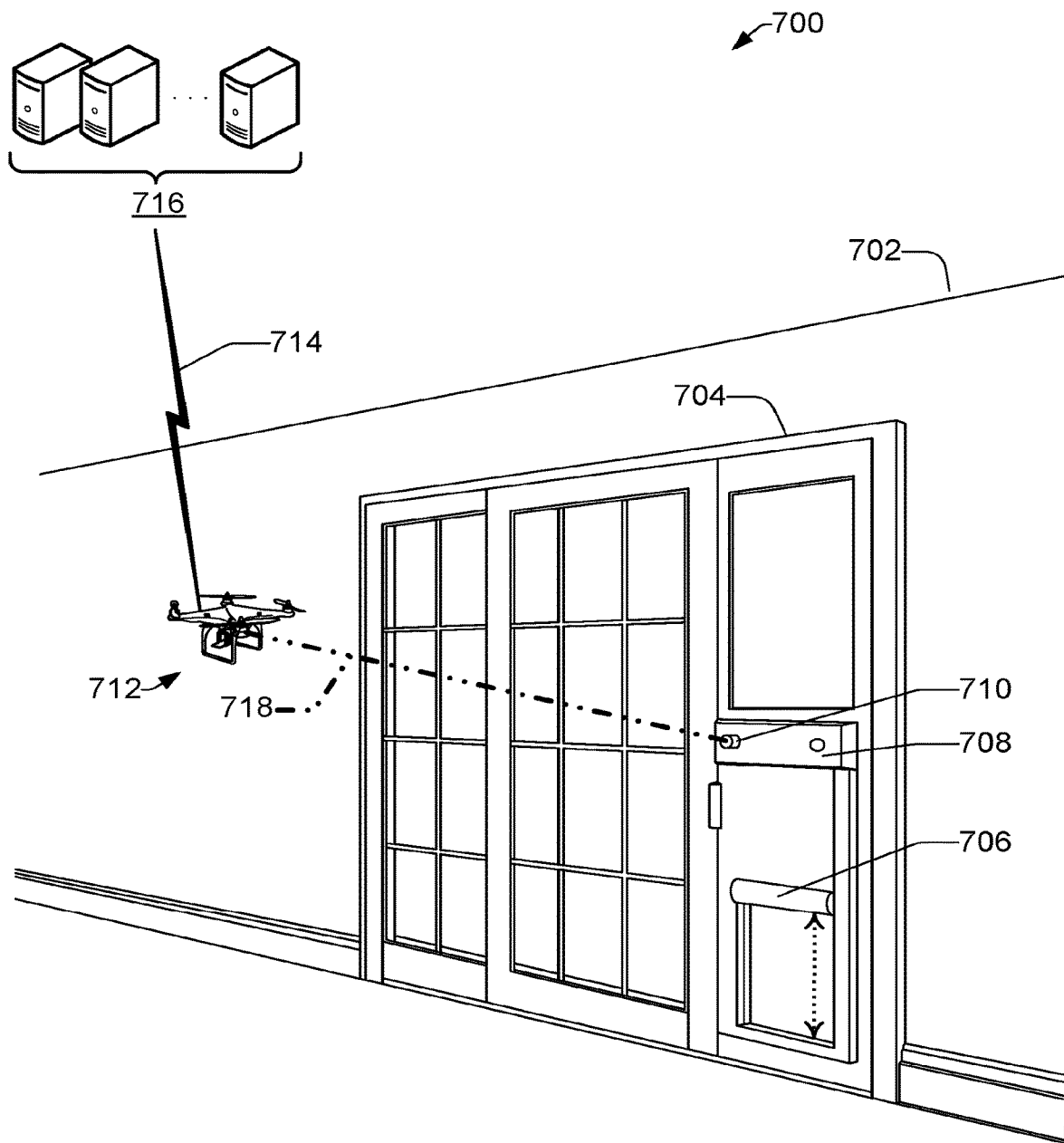
FIG. 7 illustrates an example system, which may form a portion of the system of FIG. 1, including a drone and a security door.

FIG. 7 illustrates an example environment or system 700 configured to collect, store, and/or analyze information from one or more inputs. In some instances, the system 700 may comprise a portion of the system described above. In some examples, the system 700 may comprise a physical property 702, which may include an access point 704. The access point 704 may comprise a barrier and/or transition from an exterior of the physical property 702 to an interior of the physical property 702, from a first exterior space to a second exterior space of the physical property 702, and/or from a first interior space to a second interior space of the physical property 702.

In some examples, the system 700 may include a security door 706, such as an electronically and/or mechanically controlled panel and/or barrier installed in a door, window, and/or other access point 704 of the physical property 702. For instance, the security door 706 may comprise a hinged or rollable door connected to an actuator which may cause the door to open (e.g., roll up, swing up, etc.) and/or close (e.g., roll down, swing down) upon actuation. For instance, the security door 706 may comprise one or more springs, motorized rollers, and/or hydraulic features communicatively coupled to a locking feature 708. The locking feature 708 may comprise a sensor 710 and/or mechanical actuator to interact with a security access feature of the drone. For instance, the locking feature 708 may comprise communication equipment using radio-frequencies, Near-Field Communication, Bluetooth, Wi-Fi, other electro-magnetic frequencies (e.g., infrared, ultraviolet, x-ray etc.), magnetic readers, and/or any other type of wireless platform, which may communicate with corresponding hardware and/or software of a drone 712. In some instances, the security door 706 may be elevated from a floor or ground of the physical property 702 such that it provides access to aerial devices, such as the drone 712 while preventing access to animals.

In some examples, the drone 712 may receive an access code 714 from a module 716 of the system 700, such as a data supplementation module, to provide access for the drone 712 to the physical property 702 (e.g., the interior of the physical property 702). The access code 714 may comprise a key (which may be encrypted) that corresponds to the locking feature 708 of the security door 706 so that, when the drone 712 is in proximity to the locking feature 708 and/or when the drone 712 transmits 718 the access code 714 to the locking feature 708, the actuator triggers an opening and/or closing of the security door 706. In some examples, the access code 714 may provide a one-time use or the access code 714 may provide multiple-uses. The access code 714 may be sent to a single or multiple drones 712. In some embodiments, the drone 712 may be programmed with the access code 714 as a part of the installation of the security 706 door at the physical property 702.

In some examples, the security door 706 may be installed at a location that is different than the physical property 702. For instance, the security door may be installed at a drone dispatch center, a drone storage facility, a drone storage vehicle, and/or the like.

Figure 8:
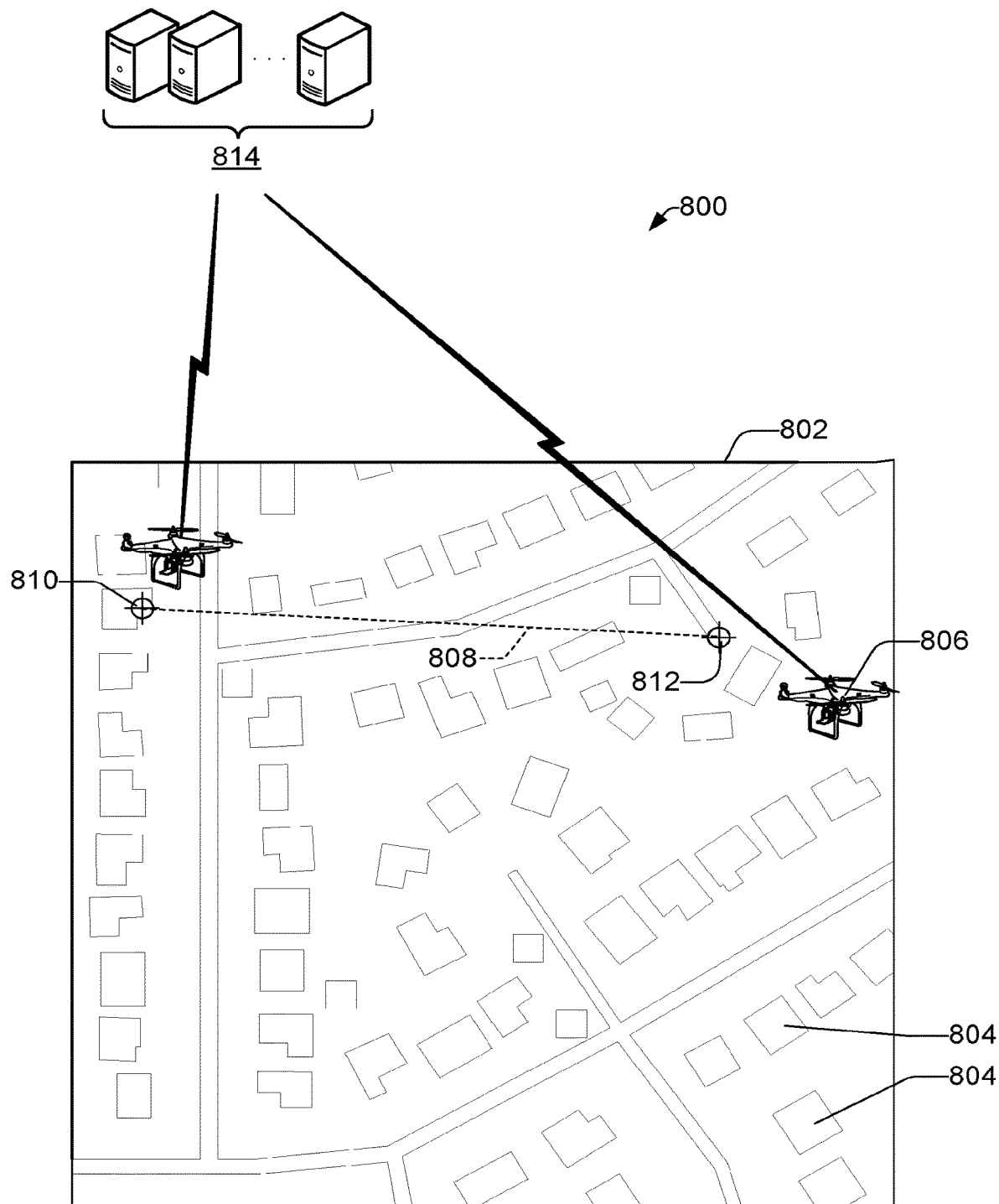
FIG. 8 illustrates an example system, which may form a portion of the system of FIG. 1, including one or more drones and a geographic region.

FIG. 8 illustrates an example environment or system 800 configured to collect, store, and/or analyze information from one or more inputs. In some instances, the system 800 may comprise a portion of the system/s described above. The system 800 may comprise one or more geographic regions ("the geographic region 802") In some examples, the geographic region 802 may comprise a street, a block, a neighborhood of multiple blocks, an area defined by zoning codes, a municipality, a state, a country, multiple countries, and/or combinations thereof. The geographic region 802 may comprise one or more physical properties 804 with corresponding information stored in the property information database. In some examples, the profile preference database may include a preference for a physical property 804 within one or more geographic regions 802. In some instances, an entity associated with a profile may indicate the preference for the geographic region by drawing and/or outlining boundaries on a displayed map (such as a digital mapping interface).

In some embodiments, one or more drones 806 may collect, store, and/or analyze data about the geographic region 802 which may affect a value of one or more physical properties 802 within the geographic region. For instance, using one or more sensors, the drone 806 may determine characteristics of the geographic region 802, such as a location of a building (e.g., school, hospital, fire department, business), park, traffic patterns, foot traffic patterns, and the like.

In some examples, the drone 806 may set one or more geolocation markers to record one or more locations of one or more characteristics/features. The drone may measure a distance 808 from a first location (e.g., as indicated by a first geolocator 810) to a second location (as indicated by a second geolocator 812). For instance, the drone 806 may travel from the first location along a type of path (e.g., a path following automobile roads, bicycle trails, walking paths, "as the crow flies", and/or combinations thereof) to the second location. The drone 806 may measure the distance 808 between the first location and the second locations, may associate the distance 808 with the type of path, and/or may send data comprising the distance 808 to one or more databases and/or modules 814 of the system 800.

In some embodiments, the drone 806 may collect information about the geographic region 802 and/or the one or more physical properties 804 in the geographic region 802, and the drone 806 may add the collected information to the property information database of the system 800. In some examples, the drone 806 may collect information about the geographic region 802 and/or a physical property 804 in the geographic region 802 in response to a preference stored in the profile preference database, in response to a request from the data supplementation module, and/or in response to a request from the entity of the system 800.

Conclusion

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A method of controlling an unmanned aerial vehicle (UAV), the method comprising:
receiving, using a transceiver of the UAV, location data;
causing, using one or more processor of the UAV executing computer-readable instructions, the UAV to travel to a property feature associated with the location data;
receiving sensor data using one or more sensors of the UAV at the property feature;
collecting audio data using a microphone of the UAV; and
causing the audio data to be compared to a predetermined audio profile for identifying a sound generating feature at the property feature traveled to by the UAV.

2. The method of claim 1, wherein the one or more sensors include a camera and the method further includes causing the UAV to transmit a live video stream of the property feature to a mobile device.

3. The method of claim 1, wherein the property feature includes at least an interior portion of a house.

4. The method of claim 1, wherein the location data includes an indication of a prohibited flight area.

5. The method of claim 1, wherein the location data is based at least partly on one or more geolocation markers along a predefined path.

6. The method of claim 5, wherein the predefined path is created by the UAV travelling between a first location and a second location, and the method further includes setting a first geolocation marker at the first location and a second geolocation marker at the second location.

7. The method of claim 1, further comprising idling, prior to receiving the location data, the UAV in a standby charging mode at a charging dock.

8. The method of claim 1, further comprising outputting, with an audio speaker of the UAV, an audio instruction to a person at the property feature, the audio instruction being generated by a user speaking into a microphone remotely from the UAV.

9. A method of controlling an unmanned aerial vehicle (UAV), the method comprising:
receiving, using one or more processors of the UAV executing computer readable instructions, location data indicating a property feature;

travelling, using the one or more processors of the UAV executing the computer readable instructions, to the property feature;

generating video data using a camera of the UAV at the property feature;

transmitting, using a transceiver of the UAV, the video data to a computing device;

collecting audio data using a microphone of the UAV at the property feature; and causing the audio data to be compared to a predetermined audio profile to identify an animal infestation.

10. The method of claim 9, wherein traveling to property feature includes exiting through a security door of a UAV dispatching device.

11. The method of claim 10, wherein the security door has one or more hinges for moving the security door between an open position and a closed position.

12. The method of claim 9, wherein the UAV is selected from a plurality of UAVs to receive an instruction based on an availability status of the UAV and a proximity of the UAV to the property feature.

13. The method of claim 9, further comprising establishing a fifth generation (5G) network communication channel, and transmitting the video data includes uploading a live video stream by using the 5G network communication channel.

14. The method of claim 9, wherein the location data is received from a smart home device.

15. The method of claim 9, further comprising:

determining that the UAV has arrived at the property feature; and switching from an autonomous control mode to a manual control mode at least partly in response to the UAV arriving at the property feature.

16. The method of claim 9, wherein traveling to the property feature includes traveling through a security door of a dispatch vehicle.

17. A method of controlling an unmanned aerial vehicle (UAV), the method comprising:

receiving, using one or more processors of the UAV executing computer readable instructions, location data associated with a property feature;

causing, using one or more processors of the UAV executing computer readable instructions, the UAV to travel to the property feature;

generating image data using one or more sensors of the UAV at the property feature;

transmitting, using a transceiver of the UAV, the image data to one or more computing device remote from the UAV;

collecting audio data with the one or more sensors of the UAV; and causing the audio data to be compared to a predetermined audio profile to identify a sound generating source.

18. The method of claim 17, further comprising causing the UAV to travel to a dispatch center to establish a network connection at the dispatch center; the image data being transmitted to the one or more computing device remote from the UAV by using the network connection established at the dispatch center.

19. The method of claim 17, wherein the location data is based at least partly on a ping generated by a hardware component at the property feature.

20. The method of claim 17, wherein the UAV includes a microphone and an audio speaker, and the method further includes causing the UAV to provide a remote interaction, using the microphone and the audio speaker, between a human at the property feature and a user of the one or more computing device.

* * * * *